US012783864B2

(12) United States Patent
Serb et al.

(10) Patent No.: US 12,783,864 B2
(45) Date of Patent: Nov. 3, 2026

(54) COMPUTER-IMPLEMENTED METHOD FOR CREATING ENCODED DATA

(71) Applicant: UNIVERSITY OF SOUTHAMPTON, Southampton (GB)

(72) Inventors: Alexander Serb, Southampton (GB); Jiaqi Wang, Southampton (GB); Ivan Kobyzev, Southampton (GB)

(73) Assignee: UNIVERSITY OF SOUTHAMPTON, Southampton (GB)

( * ) Notice: Subject to any disclaimer, the term of this patent is extended or adjusted under 35 U.S.C. 154(b) by 1237 days.

(21) Appl. No.: 17/613,979

(22) PCT Filed: May 26, 2020

(86) PCT No.: PCT/GB2020/051269

§ 371 (c)(1),
(2) Date: Nov. 24, 2021

(87) PCT Pub. No.: WO2020/240168

PCT Pub. Date: Dec. 3, 2020

(65) Prior Publication Data

US 2022/0222517 A1 Jul. 14, 2022

(30) Foreign Application Priority Data

May 24, 2019 (GB) ..................................... 1907382

(51) Int. Cl.
*G06N 3/065* (2023.01)
*G06N 3/045* (2023.01)

(52) U.S. Cl.
CPC ............ *G06N 3/065* (2023.01); *G06N 3/045* (2023.01)

(58) Field of Classification Search
CPC .............................. G06N 3/065; G06N 3/045
See application file for complete search history.

(56) References Cited

U.S. PATENT DOCUMENTS 10,970,629 B1 * 4/2021 Dirac ....................... G06N 7/01
2013/0230058 A1 * 9/2013 Summerson ............ H04L 69/22 370/474

(Continued)

OTHER PUBLICATIONS

A. Patyk-Łońska, M. Czachor and D. Aerts, "A comparison of geometric analogues of holographic reduced representations, original holographic reduced representations and binary spatter codes," 2011 Fed. Conf. on Computer Science and Information Systems (FedCSIS), Szczecin, Poland, 2011, pp. 221-228 (Year: 2011).*

(Continued)

*Primary Examiner* — Jeremy L Stanley
(74) *Attorney, Agent, or Firm* — VOLPE KOENIG

(57) ABSTRACT

A computer-implemented method for creating encoded data for use in a cognitive computing system. The method comprises the steps of receiving a plurality of hypervectors, each representing a respective semantic object; element-wise modular addition of two or more of the plurality of hypervectors, thereby binding the corresponding semantic objects; and vector concatenation of two or more of the plurality of hypervectors, thereby superposing the corresponding semantic objects. The method may be carried out by a cognitive processing unit that may be part of a cognitive computing system.

24 Claims, 7 Drawing Sheets

(56) References Cited

U.S. PATENT DOCUMENTS

Figure 1:
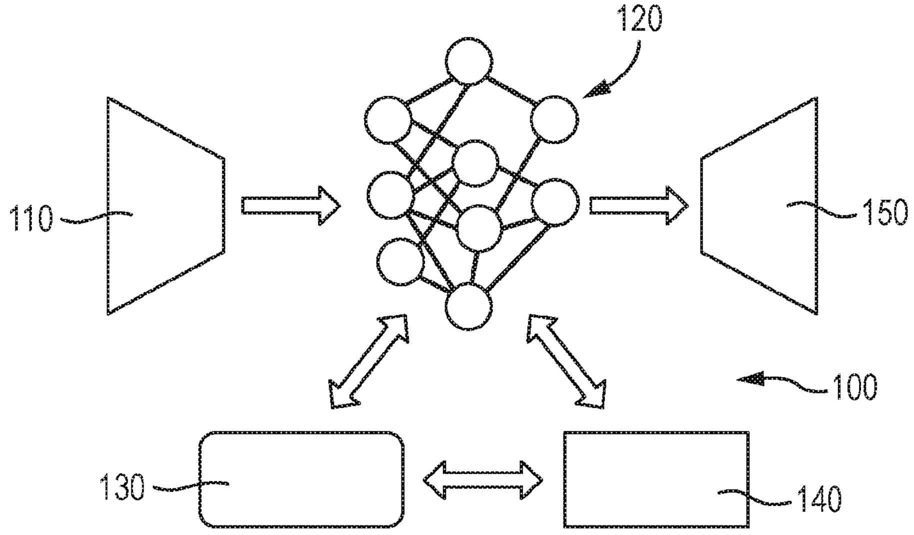

| | | | | |
|---|---|---|---|---|
| 2013/0254466 | A1* | 9/2013 | Jiang | G06F 11/1072 711/103 |
| 2015/0128233 | A1* | 5/2015 | Nechytaylo | H04W 12/12 726/6 |
| 2015/0325116 | A1* | 11/2015 | Umminger, III | G08C 17/00 367/197 |
| 2017/0091620 | A1* | 3/2017 | Gokmen | G06N 3/04 |
| 2017/0103022 | A1* | 4/2017 | Kreinin | G06F 9/30043 |
| 2017/0322810 | A1* | 11/2017 | Navada | G06F 9/3001 |
| 2018/0203699 | A1* | 7/2018 | Stephens | G06F 9/3861 |
| 2018/0225570 | A1* | 8/2018 | Eliasmith | G06N 3/08 |
| 2018/0321942 | A1* | 11/2018 | Yu | G06F 9/30036 |
| 2018/0341486 | A1* | 11/2018 | Fowers | G06F 9/3867 |
| 2019/0007062 | A1* | 1/2019 | Twitto | H03M 13/152 |
| 2019/0026625 | A1* | 1/2019 | Vorenkamp | G06N 3/044 |
| 2019/0057303 | A1* | 2/2019 | Burger | G10L 15/02 |
| 2019/0370652 | A1* | 12/2019 | Shen | G06E 3/006 |
| 2020/0050919 | A1* | 2/2020 | Gosmann | G06N 3/049 |
| 2020/0186277 | A1* | 6/2020 | Rezazadehreyhani | H04B 7/0413 |
| 2020/0204197 | A1* | 6/2020 | Maunder | H03M 13/6362 |
| 2020/0265043 | A1* | 8/2020 | Graham | G06F 9/5066 |
| 2020/0272895 | A1* | 8/2020 | Cherubini | G06F 7/582 |
| 2020/0302281 | A1* | 9/2020 | Voelker | G06N 3/049 |
| 2020/0319885 | A1* | 10/2020 | Eyole | G06F 9/30098 |
| 2020/0356367 | A1* | 11/2020 | Van Lunteren | G06F 9/3824 |
| 2020/0379673 | A1* | 12/2020 | Le Gallo-Bourdeau | G06G 7/22 |
| 2020/0381048 | A1* | 12/2020 | Le Gallo-Bourdeau | G11C 13/0069 |
| 2020/0394017 | A1* | 12/2020 | Fritz | G06F 7/505 |
| 2021/0136362 | A1* | 5/2021 | Lee | H04N 19/159 |
| 2023/0342150 | A1* | 10/2023 | Vougioukas | G06F 9/3844 |

OTHER PUBLICATIONS

Mohsen Imani, Sahand Salamat, Saransh Gupta, Jiani Huang, and Tajana Rosing. 2019. FACH: FPGA-based acceleration of hyperdimensional computing by reducing computational complexity. In Proceedings of the 24th Asia and South Pacific Design Automation Conference (ASPDAC '19). (Year: 2019).*

Cedric Seger. An investigation of categorical variable encoding techniques in machine learning: binary versus one-hot and feature hashing. KTH, School of Elec. Eng, and Comp. Sci. Independent Thesis Basic Level. Oct. 26, 2018. URN: urn:nbn:se:kth:diva-237426. DiVA, id: diva2:1259073. (Year: 2018).*

Javier Snaider and Stan Franklin. Modular Composite Representation. Cognitive Computation. vol. 6, pp. 510-527. Jan. 23, 2014. [accessed on the Internet: https://link.springer.com/article/10.1007/s12559-013-9243-y]. (Year: 2014).*

D. Kleyko, D.A. Rachkovskij, E. Osipov, and A. Rahimi. A Survey on Hyperdimensional Computing aka Vector Symbolic Architectures, Part I: Models and Data Transformations. ACM Computing Surveys, vol. 55, Issue 6. Article No. 130, pp. 1-40. Dec. 7, 2022. https://doi.org/10.1145/3538531 (Year: 2022).*

J. R. Anderson et al, "ACT-R: A theory of Human Level Cognition and Its Relation to Visual Attention", HumanComputer Interaction, vol. 12, No. 4, pp. 439-462, Dec. 1997.

R. Waser and M. Aono, "Nanoionics-based resistive switching memories," Nature materials, vol. 6, No. 11, p. 833, 2007.

X. Ma, D. B. Strukov, J. H. Lee, and K. K. Likharev, "Afterlife for silicon: Cmol circuit architectures," in Nanotechnology, 2005. 5th IEEE Conference on. IEEE, 2005, pp. 175-178.

M. Prezioso, F. Merrikh-Bayat, B. Hoskins, G. Adam, K. K. Likharev, and D. B. Strukov, "Training and operation of an integrated neuromorphic network based on metal-oxide memristors," Nature, vol. 521, No. 7550, p. 61, 2015.

A. Serb, J. Bill, A. Khiat, R. Berdan, R. Legenstein, and T. Prodromakis, "Unsupervised learning in probabilistic neural networks with multi-state metal-oxide memristive synapses," Nature communications, vol. 7, p. 12611, 2016.

A. Serb, E. Manino, I. Messaris, L. Tran-Thanh, and T. Prodromakis, "Hardware-level bayesian inference," in 31st Conference on Neural Information Processing Systems (NIPS). NIPS, 2018.

F. Merrikh-Bayat and S. B. Shouraki, "Memristive neuro-fuzzy system." IEEE Trans. Cybernetics, vol. 43, No. 1, pp. 269-285, 2013.

R. Berdan, A. Serb, A. Khiat, A. Regoutz, C. Papavassiliou, and T. Prodromakis, "A u-controller-based system for interfacing selectorless rram crossbar arrays," IEEE Transactions on Electron Devices, vol. 62, No. 7, pp. 2190-2196, 2015.

M. A. Zidan, H. Omran, A. Sultan, H. A. Fahmy, and K. N. Salama, "Compensated readout for high-density mos-gated memristor crossbar array," IEEE Transactions on Nanotechnology, vol. 14, No. 1, pp. 3-6, 2015.

A. Serb, W. Redman-White, C. Papavassiliou, and T. Prodromakis, "Practical determination of individual element resistive states in selectorless rram arrays," IEEE Transactions on Circuits and Systems I: Regular Papers, vol. 63, No. 6, pp. 827-835, 2016.

P. Dudek and P. J. Hicks, "A cmos general-purpose sampled-data analogue microprocessor," in Circuits and Systems, 2000. Proceedings. ISCAS 2000 Geneva. The 2000 IEEE International Symposium on, vol. 2. IEEE, 2000, pp. 417-420.

H. Schroeder, V. V. Zhirnov, R. K. Cavin, and R. Waser, "Voltage-time dilemma of pure electronic mechanisms in resistive switching memory cells," Journal of applied physics, vol. 107, No. 5, p. 054517, 2010.

A. C. Torrezan, J. P. Strachan, G. Medeiros-Ribeiro, and R. S. Williams, "Sub-nanosecond switching of a tantalum oxide memristor," Nanotechnology, vol. 22, No. 48, p. 485203, 2011.

F. Alibart, L. Gao, B. D. Hoskins, and D. B. Strukov, "High precision tuning of state for memristive devices by adaptable variation-tolerant algorithm," Nanotechnology, vol. 23, No. 7, p. 075201, 2012.

A. Serb, A. Khiat, and T. Prodromakis, "Seamlessly fused digital-analogue reconfigurable computing using memristors," Nature communications, vol. 9, No. 1, p. 2170, 2018.

S. Stathopoulos, A. Khiat, M. Trapatseli, S. Cortese, A. Serb, I. Valov, and T. Prodromakis, "Multibit memory operation of metal-oxide bi-layer memristors," Scientific reports, vol. 7, No. 1, p. 17532, 2017.

Serb et., "A semi-halographic hyperdimensional representation system for hardware-friendly cognitive computing", Jul. 15, 2019, available at https://arxiv.org/abs/1907.05688.

Hamdioui et al., "Applications of Computation-In-Memory Architectures based on Memristive Devices", 2019 Design, Automation & Test in Europe Conference & Exhibition (DATE), Mar. 25, 2019.

Neubert et al., "Towards Hypervector Representations for Learning and Planning with Schemas", KI 2018: Advances in Artificial Intelligence, Lecture Notes in Computer Science (LNCS) vol. 1117 pp. 182-189, Aug. 30, 2018.

Serb et al., "An analogue-domain, switch-capacitor-based arithmetic-logic unit", 2019 IEEE International Symposium on Circuits and Systems, May 1, 2019.

Denis et al., "Classification and Recall with Binary Hyperdimensional Computing: Tradeoffs in Choice of Density and Mapping Characteristics"; vol. 29, No. 12; Dec. 1, 2018; pp. 5880-5898.

Hersche et al., Exploring Embedding Methods in Binary Hyperdimensional Computing: A Case Study for Motor-Imagery based Brain-Computer Interfaces; Dec. 30, 2018 available at https://arxiv.org./pdf/1812.05705.pdf.

Crawford et al., "Biologically Plausible, Human-Scale Knowledge Representation", Cognitive Science, vol. 40, No. 4, Jul. 14, 2015 pp. 782-821.

* cited by examiner

COMPUTER-IMPLEMENTED METHOD FOR CREATING ENCODED DATA

The present invention relates to a computer-implemented method for creating encoded data for use in a cognitive computing system, a cognitive processing unit, a cognitive computing system, a computer program product, and a computer-readable storage medium.

A cognitive computing system allows manipulation of sematic-level information or other data. Cognitive computing systems are a subset of artificial neural network (ANN)-based systems, which to date mainly rely on statistical learning, i.e. some form of pattern recognition and interpolation (in time, space, etc.). In contrast to other ANN-based systems, cognitive computing systems support fluid reasoning and syntactic generalization, i.e. the application of previous knowledge to solve novel problems. This is achieved by packaging data generated by traditional ANNs into higher level variables, thus encoding new semantic objects not yet encountered by the ANN. Such semantic objects may encode relations between data objects generated by traditional ANNs, and as such can be manipulated through pre-defined computing operations by the cognitive computing system. This allows the cognitive computing system to run algorithms in a similar manner as a conventional arithmetic logic unit (ALU).

To date, a number of cognitive processing units (CoPUs) have been proposed to perform post processing of ANN-generated data objects, most notably the ACT-R architecture (J. R. Anderson et al, "ACT-R: A theory of Human Level Cognition and Its Relation to Visual Attention", Human-Computer Interaction, vol. 12, no. 4, pp. 439-462, dec 1997) and the semantic pointer architecture SPA (C. Eliasmith's book "How to build a brain: a neural architecture for biological cognition"), which is an effort to manipulate symbols using neuron-based implementations. Handling the complex interactions/operations between semantic objects requires both orderly semantic object representations and mathematical machinery to carry out useful semantic object manipulation operations. Hyper-dimensional vectors (hypervectors) have emerged as the de facto standard approach for semantic object representation, and are employed in both the SPA and ACT-R. The mathematical machinery for manipulating hypervectors in the SPA and ACT-R includes generalised vector addition (combining two vectors in a way that the result is as similar to both operands as possible), vector binding (combining two vectors in such way that the result is as dissimilar to both operands as possible) and normalisation (scale vector elements so that overall vector magnitude remains constant). These operations may be instantiated in holographic (all operands and results have fixed common length) or non-holographic manner. Non-holographic systems have employed convolution or tensor products as binding. Holographic approaches have used circular convolution and element-wise XOR as binding.

The binding operation employed by SPA and ACT-R relies on multiplication of the hypervectors representing the sematic objects. Such multiplication is computationally expensive and inefficient, making CoPUs based on the SPA or ACT-R inefficient. Further, the mathematical machinery underlying existing CoPUs requires uncompressed data for semantic object manipulation, thus needing increased storage space compared to processing units that are able to operate on compressed data.

There is thus a need for a method for creating encoded data for use in a cognitive computing system with improved computational efficiency and the ability to operate on compressed data.

According to an aspect of the invention, there is provided a computer-implemented method for creating encoded data for use in a cognitive computing system. The method comprises the steps of receiving a plurality of hypervectors, each representing a respective semantic object; element-wise modular addition of two or more of the plurality of hypervectors, thereby binding the corresponding semantic objects; and vector concatenation of two or more of the plurality of hypervectors, thereby superposing the corresponding semantic objects. The element-wise modular addition step and the vector concatenation step create new hypervectors, which may be used in subsequent element-wise modular addition and/or vector concatenation. In this manner, the method may represent complex semantic objects by hypervectors, using operations that do not rely on multiplication and so are computationally efficient. The hypervectors created by the method may be used by ANNs for data classification, such as image or speech recognition, or to form the basis of an interrogable system from which information that is encoded in the hypervectors can be extracted.

The method may be for extracting information from a cognitive computing system. For such information extraction, the element-wise modular addition step comprises binding a filler semantic object to a pointer base item, thereby creating a first hypervector. To extract information, the method further comprises extracting the hypervector representing the filler semantic object from the first hypervector by binding the first hypervector with the inverse of the hypervector representing the pointer base item. In this manner, information encoded by the method in the initial vector concatenation and element-wise modular addition steps can be extracted again.

Each hypervector may have a maximum allowable length n, consist of one or more subvectors, each subvector having a fixed length y, and each element of each hypervector may be an integer in the range from 0 to p-1. One or more of n, y and p may be powers of 2. This makes implementation of the method using digital hardware particularly efficient. Alternatively, instead of being a power of 2, p may be a prime number. This allows the construction of longer non-tautological self-bindings (i.e. binding of a hypervector to itself), improving the number of distinct semantic objects that can be encoded by the method by selfbinding operations.

According to another aspect of the invention, there is provided a cognitive processing unit for use in a cognitive computing system. The cognitive processing unit comprises an input for receiving a plurality of hypervectors, a superposition module configured to concatenate two or more of the plurality of hypervectors, and a binding module configured for element-wise modular addition of two or more of the plurality of hypervectors. The superposition module may comprise a multiplexer-demultiplexer pair configured to concatenate the two or more of the hypervectors. The binding module may comprise an add/subtract circuit configured for element-wise modular addition or subtraction of the two or more of the hypervectors. The cognitive processing unit may thus create encoded data for use in a cognitive computing system, in accordance with the computer implemented method. The cognitive processing unit may consist of entirely digital hardware, making implementation of the method particularly efficient.

According to another aspect of the invention, there is provided a cognitive computing system comprising the cognitive processing unit. The cognitive computing system may further comprise one or more artificial neural networks configured to generate the plurality of hypervectors, and/or provide the plurality of hypervectors to the cognitive processing unit. The cognitive computing system may further comprise a memory configured to store the hypervectors created by the cognitive processing unit. The artificial neural network may use the hypervectors created by the cognitive processing unit through binding and/or superposition for data classification, such as image or speech recognition, or for generating new output signals for use by an output device.

Figure 2:
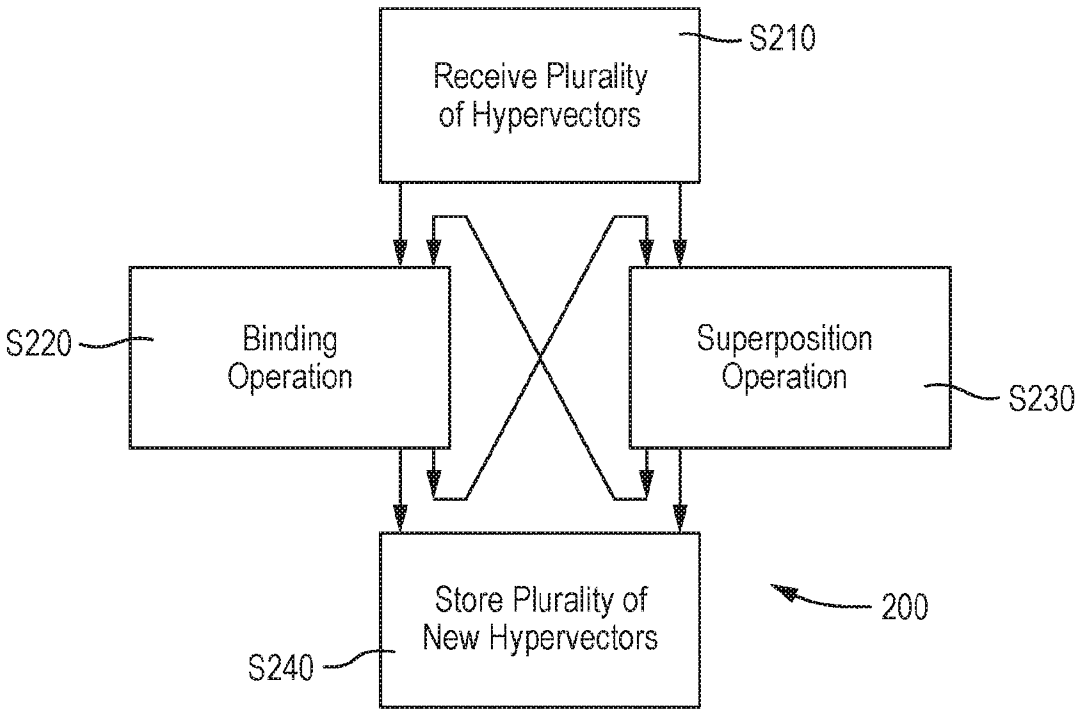

The invention will be more clearly understood from the following description, given by way of example only, with reference to the accompanying drawings, in which:

FIG. 1 schematically depicts a cognitive computing system in accordance with an embodiment;

FIG. 2 schematically depicts a method for creating encoded data for use in a cognitive computing system in accordance with an embodiment;

FIG. 3 schematically depicts a cognitive processing unit in accordance with an embodiment;

FIG. 4 schematically depicts an analogue ALU for use in a cognitive processing unit in accordance with an embodiment; and FIG. 5 shows technical context for the analogue ALU, as well as operation and performance parameters of the analogue ALU.

The features shown in the figures are not necessarily to scale and the size or arrangements depicted are not limiting. It will be understood that the figures may include optional features which are not essential to any embodiments. Furthermore, not all of the features described herein are depicted in the figures and the figures may only show a few of the components relevant for a describing a particular embodiment.

FIG. 1 schematically shows a cognitive computing system 100. The cognitive computing system 100 may comprise one or more sensors 110, one or more artificial neural networks (ANNs) 120, a memory 130, a cognitive processing unit (CoPU) 140, and an output device 150. The sensor 110 may comprise a camera or other image sensor, a microphone, a thermometer, or any other sensor for generating an input signal or input data that can be encoded by the ANN 120. The ANN 120 may be a deep neural network, such as a convolutional neural network (CNN), for example. The output device 150 may be a display or projector, a speaker, a printer, or one or more actuators (such as one or more actuators forming an actuator arm, for example holding a writing device for drawing an output image), for example. In addition, the cognitive computing system may comprise other components, such as classical microprocessors.

The ANN 120 may receive input data (e.g. from the sensors 110), for example input data representing an image, sound/speech, text, temperature, any other distinguishable characteristic, or combinations thereof. The ANN 120 may also receive such input data from any other means, for example through data communication from an external device such as a computer. The ANN 120 may encode the received input data, so as to generate ANN-generated data, such as a plurality of hypervectors (or hyper-dimensional vectors), from the input data. A hypervector is a vector with a large number of elements or components, for example more than 30 or more than 100 elements. For use in complex cognitive computing systems, hypervectors preferably have more than 2000 elements, for example 2000 to 40000 elements.

Each hypervector of the plurality of hypervectors generated by the ANN 120 represents a base item or base semantic object. These base items or base semantic objects may be considered to encode the fundamental vocabulary that may be used by the cognitive computing system 100. For example, a base item may represent a concept such as "red", "round", "apple", "colour", "object", etc., as determined by the ANN 120 based on the input data (e.g. based on image data representing a red apple). Instead of being created by an ANN 120, hypervectors representing base items may also be engineered by a human (e.g. starting from an ANN-generated hypervector or starting from a null hypervector—i.e. an empty hypervector with no magnitude) to have particular desirable properties.

Base semantic objects may generally be considered to fall into two categories, in particular pointer semantic objects ("pointers" or "roles") and filler semantic objects ("fillers"). Pointer semantic objects may represent a value or object, such as "colour", "object", etc. Pointer semantic objects may be represented by an invertible hypervector, i.e. a hypervector comprising only invertible elements (in particular, invertible with respect to the binding and superposition operations described below). Pointer semantic objects may be engineered by a human, for example. Filler semantic objects may represent an attribute or descriptor (for such a value), such as "red", "round", "apple", etc. Filler semantic objects need not necessarily be represented by an invertible hypervector, and so may be represented by an invertible or non-invertible hypervector. The combination of a pointer and a filler is referred to as a filler-pointer pair (or filler-role pair) or as an attribute-value pair.

The memory 130 may store the plurality of hypervectors representing the base semantic objects and other semantic objects. The memory 130 may also store the semantic object (as it would be recognizable by a human) in relation to the respective hypervector. The ANN 120 and the memory 130 may be in communication with one another. The memory 130 is not necessarily a component separate to the ANN 120, but may be integrated with the ANN 120. The ANN 120 may create hypervectors based on input data, for example, by analysing the input data to create an initial "best-guess" hypervector, and then searching the memory 130 for and outputting a hypervector most similar to this "best-guess" hypervector (e.g. by comparing the "best-guess" hypervector with all other hypervectors stored in the memory 130). The ANN 120 may also adjust the hypervectors stored in memory 130, for example based on a plurality of "best-guess" hypervectors generated by the ANN 120. The hypervectors stored in memory 130 may thus be a weighted average of "best-guess" hypervectors generated by the ANN 120 for any given base semantic objects. The ANN 120 is thus able to recognize previously recognized base items (such as "red", "apple", etc.) in input data (such as an image, speech/sound, etc.). The ANN 120 can be thus be used for the purpose of data classification, such as image and/or speech recognition.

The ANN 120 may be in communication with the output device 150. The ANN 120 may decode one or more hypervectors for use by the output device 150, thereby generating an output signal. The ANN 120 may decode the hypervector in different ways for use by different output devices 150. The output signal may be provided to the output device 150. The output signal may represent (but not necessarily be identical to) the input data originally encoded by the ANN 120 in form of the hypervector, although possibly in a different format. For example, the ANN 120 might receive image data generated by a camera, encode this data as a hypervector and optionally store the encoded data in the memory 130. When queried, or immediately after receiving the image data, the ANN 120 may decode the hypervector to generate an output signal usable by, for example, an actuator arm holding a writing device (such as a pen), and provide this output signal to the actuator arm. Based on this output signal, the actuator arm may then draw an image that imitates (but is not necessarily identical to) the original image captured by the camera. The ANN 120 might also decode the hypervector for use by a display, which may display the output signal in form of an image, for example. In this manner, the ANN 120 may be used to decode and output (optionally in a different format) previously encoded input data.

However, the ANN 120 as such does not support fluid reasoning and syntactic generalization, i.e. the ANN 120 is not able to encode concepts not previously encountered. In other words, the ANN 120 as such is not capable of imagining new concepts (or new base items), and so lacks a fundamental part of cognition. To overcome this drawback, and improve the capabilities of image and/or speech recognition for example, the cognitive computing system 100 comprises the CoPU 140.

The CoPU 140 may package classified information generated by the ANN 120 into higher-level semantic objects, and may manipulate such higher-level semantic objects. This is achieved by combining existing hypervectors (that may encode known or previously encountered data) to create new hypervectors (that encode data not previously encountered by the ANN 120). The new hypervectors may then be used by the cognitive computing system in the same manner in which already existing hypervectors are used. As such, the CoPU 140 is for creating encoded data for use in the cognitive computing system 100. For example, the CoPU 140 may be for creating encoded data for use by the ANN 120, for example for use by the ANN 120 for input data classification (or for encoding input data) and/or for output data generation. Current CoPUs, such as those relying on the ACT-R architecture or the SPA architecture, require multiplication of hypervectors for semantic object manipulation. Such multiplication is computationally inefficient and expensive. Furthermore, an operation based on multiplication (and its inverse operation of division) does not always lead to a valid number for an allowably integer set that may be used by the cognitive computing system 100. For example, a division operation may result in a non-integer which cannot unambiguously be resolved to exist in the cognitive computing system 100, making the cognitive computing system 100 less reliable. It is preferable to provide well-defined areas of closure for any possible operation, so as to allow a more simple definition of the conditions under which an operation will be closed (i.e. the operation creates a hypervector that can be confirmed to exist). The ACT-R and SPA architectures can further not operate on compressed data, making storage of data created by these architectures inefficient.

The CoPU 140 according to an embodiment of the invention may receive a plurality of hypervectors. The plurality of hypervectors may be received from the ANN 120, from the memory 130, or from an external device such as a computer. Each of the plurality of hypervectors may represent a respective semantic object. Each respective semantic object may, for example, be a base semantic object that is generated by the ANN 120 or engineered by a human, or a higher-level semantic object created by the cognitive processing unit 140 in the manner described further below. The CoPU 140 may then manipulate the received hypervectors using a binding operation and/or a superposition operation. The binding and/or superposition operation creates a new hypervector. The new hypervector may encode data (e.g. a semantic object) not previously encountered by the ANN 120. The binding operation and/or the superposition operation may also be carried out on hypervectors that have been created by the CoPU 140 in previous binding and/or superposition operations.

The binding operation "*" includes element-wise modular addition of two or more of the plurality of hypervectors. This binds the semantic objects corresponding to these two or more of the plurality of hypervectors. For example, "a*b", so binding a first semantic object represented by a first hypervector $a=(a_1, a_2, a_3, \ldots, a_y)$ and a second semantic object represented by a second hypervector $b=(b_1, b_2, b3, \ldots, b_y)$, results in creation of a new semantic object represented by a new hypervector $(a_1+b_1, a_2+b_2, a_3+b_3, \ldots, a_y+b_y)$. This newly created hypervector comprises the same number of y elements as each of the hypervectors that are bound. The binding operation may be used to create filler-pointer pairs of semantic objects, by binding a filler semantic object and a pointer semantic object (e.g. "red*colour": the attribute of the "colour" value is "red").

The superposition operation "+" includes vector concatenation of two or more of the plurality of hypervectors. The superposition operation "+" is defined by a+b=(a, b). This superposes the semantic objects corresponding to these two or more of the plurality of hypervectors. For example, superposing a first semantic object represented by a first hypervector $a=(a_1, a_2, a_3, \ldots, a_y)$ and a second semantic object represented by a second hypervector $b=(b_1, b_2, b_3, \ldots, b_y)$ results in creation of a new semantic object represented by a new hypervector $(a_1, a_2, a_3, \ldots, a_y, b_1, b_2, b_3, \ldots, b_y)$. This newly created hypervector comprises an integer multiple of y elements (in the example above, 2y elements). The superposition operation may be used to simultaneously hold multiple base items in memory (e.g. a memory that is part of the CoPU 140), for example for the purpose of creating a composite semantic object such as "colour*red+object*apple" (to represent a red apple), or for the purpose of collecting unrelated items such as "shape*circle+shape*square" (to represent a circle and a square).

As shown in the examples above, the binding and superposition operations may be applied to hypervectors created by earlier binding and superposition operations. Complex semantic objects may thus be represented by hypervectors created by the CoPU 140. The hypervectors created by the CoPU 140, such as the hypervectors created by binding and/or superposing operations, may be stored in the memory 130.

The CoPU 140 is thus capable of creating new hypervectors that represent new semantic objects, for example semantic objects never encountered by the ANN 120. The CoPU 140 may thus imagine new semantic objects. This is achieved through superposition and binding operations that do not require multiplication, and so can very efficiently and reliably be implemented in hardware. The new hypervectors may be used by the ANN 120 for image and/or speech recognition, for example, thereby allowing the ANN 120 to recognize concepts not previously encountered by the ANN 120. This considerably improves the capabilities of the cognitive computing system 100. In addition, the cognitive processing unit 140 may be used to build an interrogable system, i.e. a system that can be interrogated for previously encoded data.

For example, the CoPU 140 may have access to and/or receive the base semantic objects “dark”, “red”, “white”, “cube”, “sphere” (fillers) and “colour”, “luminosity”, “shape” (pointers). The CoPU 140 may create a new hypervector M (by combining the hypervectors representing each of the relevant base semantic objects using the binding and superposition operations) representing the semantic object “dark, red cube”, even if the ANN 120 has never encountered such a semantic object before, and may store this new hypervector M in the memory 130. When the ANN 120 subsequently encounters a dark, red cube, for example in input image data provided to the ANN 120, then the ANN 120 may recognize this input image data as relating to the new semantic object represented by the new hypervector M stored in memory 130, and the ANN 120 may encode this newly encountered semantic object in the input data as (or based on) this new hypervector M.

Similarly, the ANN 120 may decode the new hypervector M (even if the semantic object represented by the hypervector M has never been encountered by the ANN 120 before) to generate output data for use by the output device 150. The output device 150 may then output the output data, for example in form of an image resembling (according to the ANN’s 120 capabilities) a dark, red cube.

The CoPU 140 may be interrogated about the new semantic object (irrespective of whether or not the new semantic object has been encountered by the ANN 120). The CoPU 140 may thus be for (the purpose of) extracting information from the cognitive computing system 100.

For example, a hypervector N created by the CoPU 140 may be equal to “dark*red*cube+white*sphere”, and this hypervector N may be held in memory internal to the CoPU 140. The CoPU 140 may answer to the question of what (in your memory/that you know of) is white? This question may be asked by providing the CoPU 140 with the inverse (inverse with respect to the binding operation) of the hypervector representing the base semantic object “white”, i.e. “white$^{-1}$”. The CoPU 140 may then answer such a question by binding “white$^{-1}$” with the hypervector N. This will be resolved as “N*white$^{-1}$=dark*red*cube*white$^{-1}$+white*white$^{-1}$*sphere=noise+sphere~=sphere”, where noise corresponds to a hypervector that does not exist (and optionally is not similar to a hypervector that exists) in the cognitive computing system. The CoPU 140 may thus provide the semantic object “sphere” as an answer.

Similarly, the CoPU 140 may answer to the question of “what can you tell me about the cube?” (asked by providing the hypervector cube$^{-1}$ to the CoPU 140), by resolving “N*cube$^{-1}$=dark*red*cube*cube$^{-1}$+white*sphere*cube$^{-1}$=dark*red+noise~=dark*red”. The CoPU 140 may thus provide the semantic object “dark red” as an answer, provided the hypervector representing the semantic object “dark red” already exists in the cognitive computing system 100 (for example because it was previously created by the CoPU 140 by binding the base semantic objects “dark” and “red”).

In an alternative example, the new hypervector N might be re-expressed or re-encoded as “(colour*red+luminosity*dark)*(shape*cube)+(colour*white)*(shape*sphere)”. The cognitive processing unit 140 may answer the question “What can you tell me about the cubic shape?” by resolving “N*(shape*cube)$^{-1}$= . . . ~colour*red+luminosity*dark”. The cognitive processing unit may thus provide the answer that its colour is red and its luminosity is dark (assuming the attribute & value can be differentiated).

As such, the binding and superposition operations that may be carried out by the CoPU 140 may be used to build an interrogable system, without the need for computationally inefficient multiplication to build that system and/or extract information from that system.

FIG. 2 shows a method 200 for creating encoded data for use in the cognitive computing system 100. The method 200 may be carried out, for example, by the CoPU 140 of the cognitive computing system 100. Alternatively, the method 200 may be carried out by instructions of a computer program product, for example stored on a computer-readable storage medium. In other words, the CoPU 140 may be implemented as a virtual CoPU constructed by a computer program product executed by a conventional CPU. The CoPU 140 need not necessarily be integrated into the cognitive computing system 100, but may work externally to the cognitive computing system 100.

The method 200 may include receiving S210 a plurality of hypervectors. Each of the plurality of hypervectors represents a respective semantic object. The hypervectors may be generated and received from the ANN 120, or received from the memory 130, or received by other means, e.g. from another storage medium or by data communication. The method 200 further comprises the binding operation S220 for binding semantic objects and the superposition operation S230 for superposing semantic objects. The binding operation S210 includes element-wise modular addition (and also element-wise modular subtraction) of two or more of the plurality of hypervectors, as described above. Element-wise modular addition comprises element-wise modular subtraction, in the sense that element-wise modular subtraction may be implemented by element-wise modular addition of a first hypervector with the inverse (with respect to the binding operation) of a second hypervector. The superposition operation S230 includes vector concatenation of two or more of the plurality of hypervectors, as described above. The binding operation S220 and the superposition operation S230 may also be carried out on hypervectors that have been created by previous binding and/or superposition operations. The method 200 may further include storing S240 the hypervectors created by the binding and superposition operations, for example in the memory 130 or in a buffer memory of the CoPU 140.

The method 200 may comprise repeating the binding operation S220 and/or the superposition operation S230, for example by using the outcome of one or more earlier operations as an operant in a future operation. The method 200 may further include controlling the sequence in which the binding operation S220 and/or the superposition operation S230 are (optionally iteratively) carried out. The method 200 may also include controlling the operands of the binding operation S220 and/or the superposition operation S230, i.e. choosing the hypervectors which are used by any given one operation. In this manner, the method 200 may control the flow and manipulation of encoded data, for example as done for running algorithms or computer programs in assembly.

The method 200 and the CoPU 140 may thus manipulate and create a plurality of hypervectors, each encoding a respective semantic objects. The method 200 and the CoPU 140 may encode hypervectors for the purpose of being used in the cognitive computing system 100. Different types of semantic objects (and associated hypervectors) can be distinguished. The simplest form of semantic objects are base semantic objects. Such base semantic objects encode the fundamental vocabulary used by the cognitive computing system 100. Each base semantic object is represented by a hypervector that consists of y integer elements or components, each integer element being in the range from 0 to p−1. The values of p and y determine the memory capacity of the cognitive computing system 100, i.e. the number of unique base semantic objects that can be reliably represented by the cognitive computing system 100. The cognitive computing system 100 is capable of representing $p^y$ unique base semantic object.

Another form of semantic objects are higher level semantic objects. Such higher level semantic objects may be created by the method 200 by manipulating two or more hypervectors representing base semantic objects using the binding operation S220 and/or the superposition operation S230. Hypervectors created only by one or more binding operations consist of the same number of integer elements as the hypervectors representing base semantic objects, i.e. y integer elements. This is because the binding operation is length preserving. By contrast, hypervectors created by one or more superposition operations comprise or consist of an integer multiple of y integer components. Such hypervectors may also be referred to as chain hypervectors, because they correspond to a chain of multiple hypervectors having y integer components. The maximum length of any hypervectors may be n=d×y elements, where d is a pre-defined maximum limit. If a superposition operation S230 creates a hypervector with length exceeding n, then the method 200 may include raising an exception or a flag. For example, the method 200 may do one of i) raise an exception and forbid the superposition operation S230, ii) truncate the resulting hypervector to n elements and raise a warning flag, and iii) raise a flag and trigger a software sequence (program) designed to handle overlength chain hypervectors (this may include, for example, handling such overlength chain hypervectors in two or more sequential operations by the CoPU 140, for example in the manner in which a 32-bit CPU can handle 64-bit numbers by breaking them in 2×32-bit numbers and performing operations in sequence). The value of d is determined by the CoPU 140 design and affects the capacity of the cognitive computing system 100 to express multiple base semantic objects (or pointer-filler pairs) at the same time. The value of d for any given hypervector is referred to as the rank of the hypervector. A hypervector representing a base semantic object has a rank d of 1, for example.

Chain hypervectors may have different lengths, by virtue of being created by a different number of superposition operations. Alternatively, any chain hypervector may be zero-padded until it forms a maximum-length chain hypervector. This may make manipulation and storage of the chain hypervector simpler. Optionally, each chain hypervector may include one or more additional elements that encode further information about the chain hypervector. For example, each chain hypervector may include one or more elements indicating the rank of the chain hypervector. Alternatively or additionally, each chain hypervector may include one or more elements acting as position indicators for respective semantic objects represented by the chain hypervector.

The values of p, y and d may be affected by the desired computational capacity of the cognitive computing system 100. Preferably, the number of base semantic objects that may be used by the cognitive computing system 100 is more than one million, for example more than 10 million or more than 1 billion. This can be achieved by different combinations of p and y. The value of y may be greater than or equal to 32, preferably greater than or equal to 128, further preferably greater than 2000, for example in the range from 2000 and 40000. Such high values for y make the hypervectors especially suitable for use in the cognitive computing system 100. The value for p is preferably greater than or equal to 8, preferably greater than or equal to 32. Lower values of p may lead to many hypervectors having elements in common, and may lead to an early onset of periodicity of self-bindings (e.g. a*b=a*b*b*b). The value for d is preferably equal or greater than 4, for example in the range from 4 to 30, preferably from 7 to 20. A value for d of 7 would mean that the CoPU 140 is in accordance with experiments that have shown that humans can hold up to 7 items in working memory at any given time.

In a preferred embodiment, the values for one or more of y, p, d and/or n are powers of 2. This allows the most efficient implementation of the method 200 using digital hardware. However, the optimal choice of p may depend on the specific implementation of the superposition and binding operations. In an alternative embodiment, the value for p is a prime number. This improves the flexibility of the binding operation. If p is not a prime number and for example 8, then binding a hypervector consisting of elements of value 4 to itself twice will result in the original hypervector. In this situation, it is not possible to distinguish between the starting hypervector and the hypervector created by two binding operations with itself. By contrast, if p is a prime number, then for any integer element x≠0, the next greatest solution for (k×x) mod p=x after k=1 is k=p+1. This allows the construction of longer non-tautological self-bindings compared to situations in which p is not a prime number.

The fundamental mathematical properties of the binding operation S220 and the superposition operation S230 are set out below. The superposition operation S230 is not closed in general, but it acts as closed when the restriction on the maximum length of the resulting hypervector comes into effect. The superposition operation S230 is associative but not commutative. The superposition operation S230 has an identity element (the empty string), but no inverse operation as such.

The binding operation S220 is not closed, but acts as closed when the restriction on the product of the ranks of the operands is met. This is always the case when one of the operands is a hypervector representing a base item. If a is a hypervector with rank 1, then for any hypervector b, the binding operation S220 is commutative: a*b=b*a. If at least one of the hypervectors a, b and c has rank 1, then the binding operation S220 is associative: (a*b)*c=a*(b*c).

The binding operation S220 and the superposition operation S230 are distributive when hypervector a has rank 1, i.e. a*(b+c)=a*b+a*c.

In terms of higher level properties of the CoPU 140 and method 200, a key metric is memory capacity: the maximum number of semantic object storable given some minimum upper bound for memory recall reliability. Each rank 1 semantic object (base item), the smallest type of independent semantic objects, must be uniquely identifiable. As a result, there can be no more than $Q=p^y$ basic memories in total without guaranteeing at least one ambiguous recall, i.e. Q is the maximum memory capacity. However, an additional sparsity requirement is necessary in order to guarantee that the system is capable of unambiguously answering queries. This is to ensure that terms such as "colour$^{-1}$*object*apple" (i.e. terms that do not make semantic sense) resolve to noise and not correspond to any valid hypervector stored in the cognitive computing system 100. In order to achieve that, an upper limit of $Q_s$ for the number of storable semantic objects stored in the cognitive computing system 100 may be imposed, where $s \in R$ is the desired sparsity factor, and the following formula holds: $Q_s = Q/s$.

A lower bound for s is given by calculating the number of basic items J that the CoPU 140 or the method 200 can create given a set of Qs vocabulary items and allowed complexity. These will all need to be accommodated unambiguously for guaranteeing reliable recall. The only operation that can create basic items from combinations of vocabulary items is the binding operation. Therefore for Qs vocabulary items we obtain $Q_s^2/s^2$ derived items arising from all the possible unordered (to account for the commutativity) pairwise bindings. This rises to $Q_s^{\gamma}/\gamma!$ for exactly γ allowed bindings, and in general the system can create:

$$J = \sum_{i=0}^{\Gamma} \frac{Q_s^i}{\Gamma!} \approx \frac{Q_s^{\Gamma}}{\Gamma!}, \text{ for } \frac{Q_s}{\Gamma} \gg 1$$

basic items, if between 0 and Γ bindings are allowed in total. Ideally, to account for all possible basic items from the fundamental vocabulary via bindings, J=Q (=$p^y$), and so $$Q_s \approx \sqrt[\Gamma]{\Gamma!} \cdot p^{\frac{y}{\Gamma}},$$

revealing how expressivity is traded against capacity, at least in the absence of any further allowances to combat possible uncertainty in the encoding, decoding or recall of semantic objects. This shows that the more binding is allowed, the less fundamental vocabulary can be memorized by the cognitive computing system 100. This is an example of a trade-off between capacity and complexity. As an example, if p=16, y=128 and Γ=20, then the upper bound on the length of the core dictionary that can be encoded is 422 million items.

In a preferred embodiment, the method 200 further comprises compressing chain hypervectors (so hypervectors with lengths of multiple y) into hypervectors of length y. This allows the cognitive computing system 100 to manipulate any hypervector and collapse it into a new memory that can be stored, recalled and used (for example by the ANN 120) with the facileness that hypervectors representing base items enjoy. In principle, any compression algorithm will suffice to compress chain hypervectors into hypervectors of length y.

For example, the genetic recombination part (but not necessarily the optimization part) of genetic algorithm-like methods, such as those discussed in K. Deb, et al. "A fast and elitist multi-objective genetic algorithm: NSGA-II,", IEEE Transactions o Evolutionary Computation, vol. 6, no. 2, pp. 182-197, April 2002, may be used on the individual subvectors (each of length y) comprised by the chain hypervector. Alternatively, these individual subvectors may be combined using any multiplication (e.g., circular convolution, etc.). Compression may also include averaging downsampling, for example by compressing a four element vector (a, b, c, d) to a two element vector (a+b, c+d). This may be computationally reversible (using a dual "de-averaging upsampling" operation). Compression may be carried out by dedicated hardware or software that is both more complex than and remotely located from the CoPU 140, reducing allowing the complexity and the footprint of the CoPU 140 to remain low.

FIG. 3 shows one embodiment of the CoPU 140 that can be implemented as a fully digital system. Other hardware implementations of the CoPU 140 are also possible, such as fully analogue CoPUs 140, e.g. using analogue multiplexers for superposition and current-steering-based binding. An analogue ALU for carrying out the binding operation on analogue signals is shown in FIG. 4. Such an analogue implementation may be preferable in situations in which the overall cognitive computing system 100 operates based on analogue signals. Alternatively, the CoPU 140 may be implemented as a "packet" based CoPU 140, which may be configured to package hypervectors into e.g. TCP-like (Transmission Control Protocol) packets and communicate across an internet-like router structure. Each packet may contain a header detailing the number of base semantic objects within the packet and a payload, a technique similar to the protocol used in neuromorphic systems communications over the internet.

The CoPU 140 of FIG. 3 comprises an input for receiving a plurality of hypervectors. The hypervectors may be received in binary format, i.e. each element of the hypervector may be represented as a binary number (e.g. in 2s complement format) using a fixed number of bits. The CoPU 140 further comprises a superposition module 144 configured to concatenate two or more of the plurality of hypervectors. The superposition module 144 may carry out the superposition operation S230 of the method 200. The CoPU 140 further comprises a binding module 142 configured for element-wise modular addition of two or more of the plurality of hypervectors. The binding module 142 may carry out the binding operation S220 of the method 200.

The superposition module 144 may comprise a (for example digital) multiplexer-demultiplexer (MUX-DEMUX) pair configured to concatenate the two or more of the hypervectors. As shown in FIG. 3*b*, the binding module 142 comprises an add/subtract circuit configured for element-wise modular addition or subtraction of the two or more of the hypervectors. The add/subtract circuit may comprise a logical inverter, for example, to allow the CoPU 140 to compute the inverse of any hypervector as the respective 2's complement.

The CoPU 140 may further comprise one or more buffer arrays or shift registers 146, for example a buffer array 146 that temporarily holds the received plurality of hypervectors and/or a buffer array 146 that temporarily hold the hypervectors created by the superposition module 144 and/or the binding module 142. The same buffer array 146 may be used to hold one or more operands (i.e. one or more input hypervectors) to be combined/manipulated by the superposition module 144 and/or the binding module 142, and to then hold the hypervector created by the superposition module 144 and/or the binding module 142 (optionally for undergoing further superposition/binding operations). The buffer array 146 may latch the output of the superposition module 144 and/or the binding module 142 for further use. The buffer array 146 of the CoPU 140 may correspond to the "working memory" of the cognitive computing system 100, i.e. hold the hypervectors that the CoPU 140 is processing at any one point.

One or more (e.g. each) buffers of the buffer array 146 may be configured to store a flag, for example an attribute flag vector, that indicates the property of the hypervector stored in the respective buffer. The attribute flag vector may be tied to any given hypervector, and for example be transmitted and stored together with the hypervector. The attribute flag vector may indicate, for example, if the corresponding hypervector represents a pointer or a filler, and optionally also whether the hypervector represents a combination of these, for example a filler-pointer pair. The attribute flag vector may be read and manipulated by a controller unit of the CoPU 140.

The superposition module 144 may carry out the superposition operation S230 as 'APPEND' operations (akin to linked lists). The superposition module 144 need only receive the operands (the hypervectors that are to be superposed) and the rank of each hypervector (i.e. the number of hypervectors of length y in any given chain hypervector). This may be implemented as d 'SELECT' operations, which directly map onto a simple (l·n)-width MUX/DEMUX pair (i.e. n 'bundles' if l binary lines). A small digital controller circuit may determine the appropriate, successive configurations of the MUX/DEMUX structure depending on the ranks of the operands. The same circuit also computes and sets the rank of the resulting chain.

The binding module 142 may carry out the binding operation S220 by n element-wise addition/subtractions (ADD/SUB), implementable as n, z-bit ADD/SUB modules. Because of the modular arithmetic rules, overflow bits may be simply ignored. The ADD/SUB terminal of each module can directly convert one of the operands into its 2's complement inverse as is standard. This is illustrated in FIG. 3*b*. The complexity of (a maximum of) n, z-bit additions can be contrasted to the computational cost of circular convolution (as in other CoPUs), which would involve $n^2$ multiplication and n·(n−1) additions. On top of this, the additional hardware cost of shifting a chosen operand of the circular convolution n times in its entirety must also be considered.

The CoPU 140 may further comprise a controller unit that orchestrates the operation of the CoPU 140. The controller unit may: i) instruct the arithmetic-logic unit (ALU) what operation to execute (ADD/SUB signal) and when (EN signal), ii) be informed by the ALU when the input operands are equal (EQ); useful for e.g. branch-equal-type Assembly-level operations, iii) control all multiplexers, iv) internally execute the flag arithmetic, and v) output an operation termination flag (done).

The CoPU 140 of FIG. 3 has been designed and simulated in Cadence using TSMC's 65 nm technology for the purposes of performance evaluation. The CoPU used: l=8, y=1, d=8. Performance was assessed in terms of power efficiency and transistor count (proxy for area footprint).

1) Power performance: The CoPU was assessed for power dissipation when: i) executing an 8-item×1-item binding operation, ii) executing an 8-item superposition and iii) in the idle state. In all cases, total system power dissipation figures include a) the internal power consumption of the system proper, b) the energy spent by minimum-size inverters in order to drive the signal (semantic object) inputs and c) the consumption of the output register buffers. For both superposition and binding, estimated worst case figures are given. For superposition, worst case is expected to be obtained when transferring the 'all elements=1' (all-1) item into locations where the 'all-0' item was previously stored. This is because all bits in both input drivers and output buffers will be flipped by the new input. Furthermore, for our tests the entire system was initialised so that every node started at voltage 0 (GND), which means that the parasitic capacitances from input MUX to output register buffers also needed to be charged to logic 1. In binding, as for superposition, the system is initialised with all inputs (and also outputs) at logic 0. The worst case is expected to be given when adding two all-1 items. This is because all inputs and all outputs bar one need to be changed to logic 1. For example going from the state 0000+0000=0000 to 1111+1111=1110 requires us to flip all 8 input bits and 334 output bits. In both cases a 20 ns clock period (50 MHz) was used and each operation lasted 9 clock cycles.

The performance figures indicate a power breakdown as summarised in table I below.

| | Superposition | Binding | Units |
|---|---|---|---|
| Total energy/op | 5.97 | 5.79 | PJ |
| Internal dissipation | 1.82 | 2.07 | PJ |
| Driver dissipation | 0.73 | 0.73 | PJ |
| Register dissipation | 3.43 | 2.99 | PJ |
| Cycles/op | 9 | 9 | — |
| Time/op | 180 | 180 | ns |
| Power @50 MHz clk | 33.2 | 33.2 | μW |

Figure 3A:
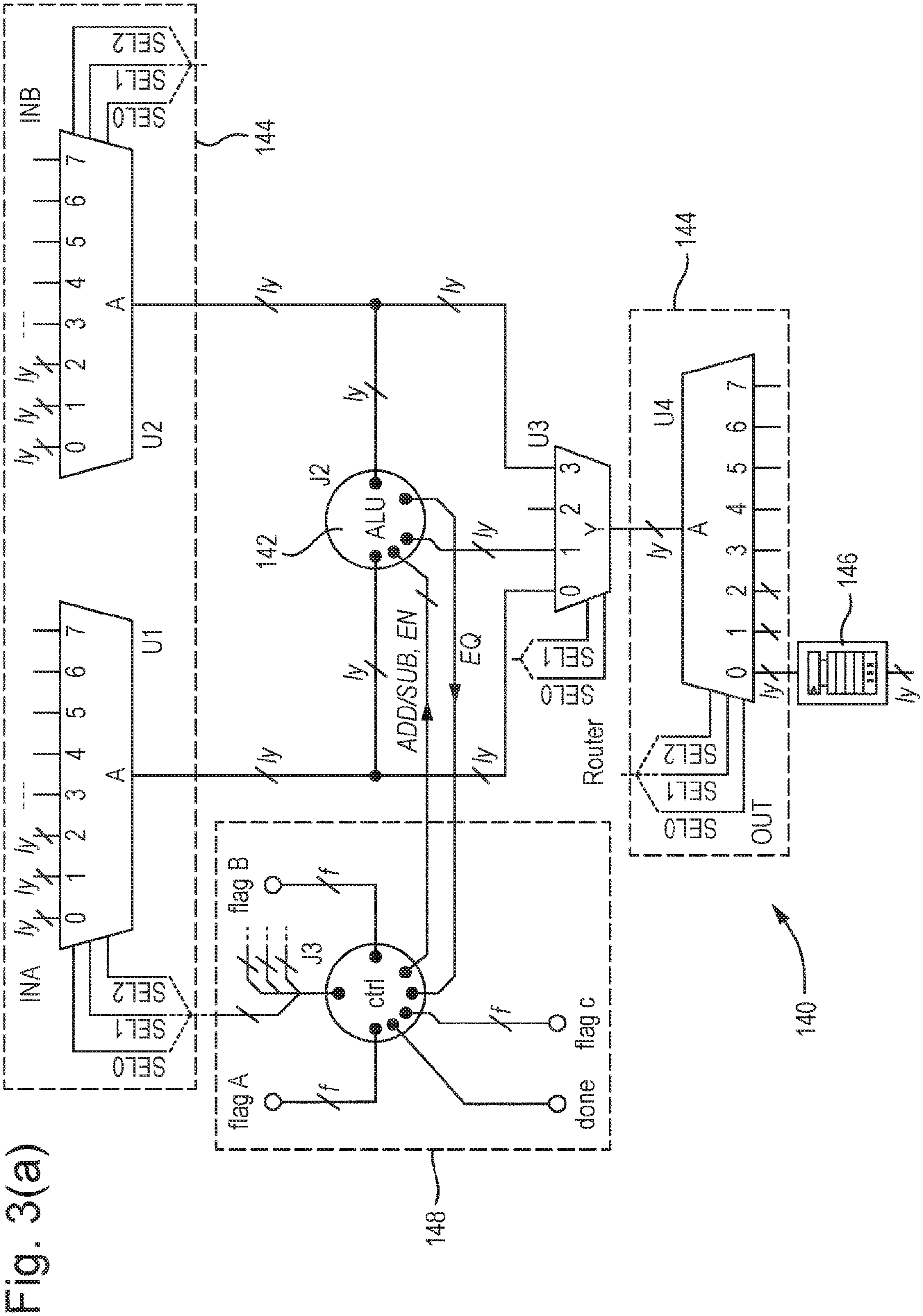
Figure 3B:
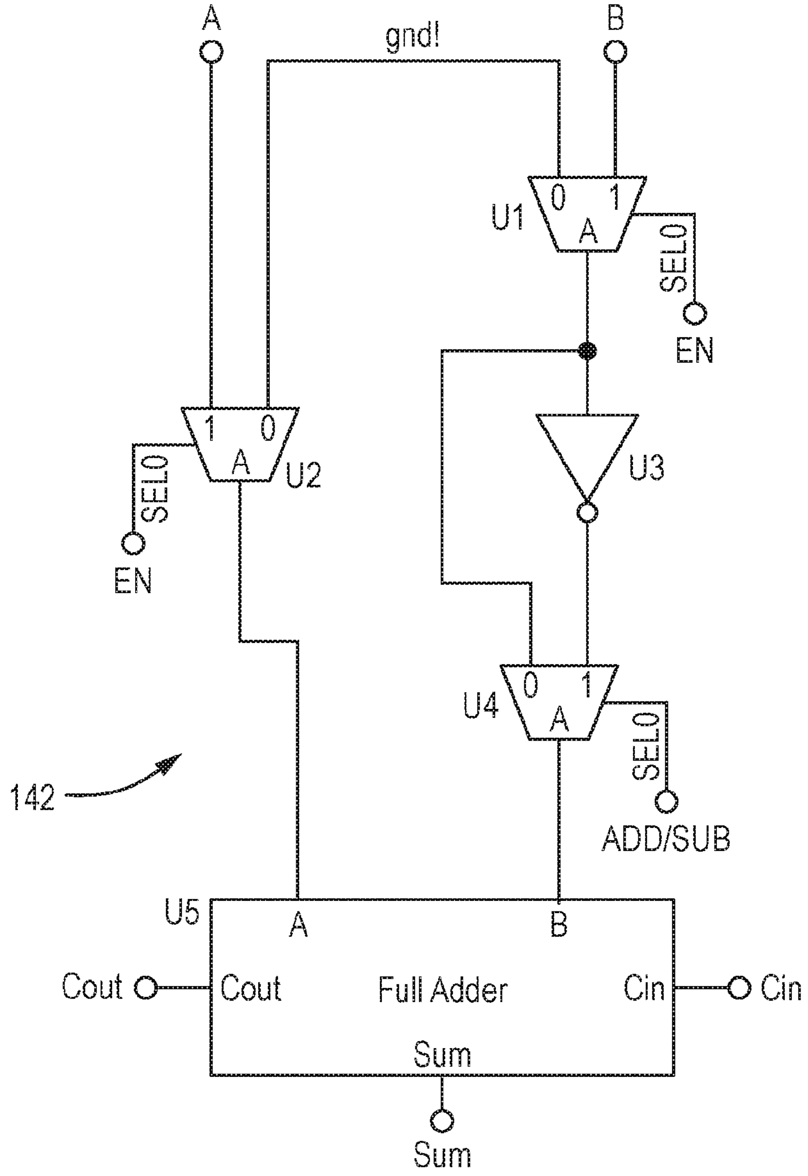

Internal dissipation refers to the power consumed by the CoPU 140 shown in FIG. 3*a*, excluding the shift register buffers. Driver dissipation is the consumption of the inverters driving the inputs to the system (not shown in FIG. 3*a*). Register dissipation refers to the buffer registers. Cycles/operation refers to how many clock cycles it takes to conclude the corresponding operation for each full item. The figures in table I indicate that most of the power is dissipated in registering the outputs (>50%). Next is the internal power dissipation, most of which occurs in the control module (≈1.6-1.7 pJ). Superposition and binding cost similar amounts of energy, although their internal breakdown is slightly different. The lower buffer register dissipation in binding (only 778 bits are flipped at the output in the estimated worst case) is counterbalanced by an increase in energy expenditure for computing the sum of the operands (added internal dissipation). Finally, static power dissipation was calculated at ≈82.5 nW.

2) Transistor count: The transistor count for the overall system and its sub-components is summarised in table II.

| | |
|---|---|
| Total | 4382 |
| Data path | 880 |
| Control module | 2304 |
| Registers | 1198 |

The data-path part of the system, which includes the MUX/DEMUX trees and ALU, only requires 880 transistors. This means 110 transistors/bit of bit-width, of which 42 are in the ALU and 68 in the MUX/DEMUX trees. In larger designs supporting longer item chains the multiplexer tree becomes deeper and adds extra transistors.

As such, the CoPU 140 can be constructed using relatively few, simple and standard electronic modules that are all very familiar to the digital designer. The relative costs of both basic operations of superposition and binding are also very similar, in contrast to the large energy imbalance between multiplication and addition carried out using conventional digital arithmetic circuits. Furthermore, the proposed CoPU 140 and method 200 lends itself naturally to speed/complexity trade-offs. First, 2×d DEMUX trees could be implemented in order to allow up to d items to be transferred simultaneously to any location of the output chain. Second, d ALUs could be arrayed in order to perform up to d×1 item bindings in a single clock cycle. Naturally the increased parallelism would result in bulkier, more power-hungry system versions. Finally, systems using smaller l in exchange for larger y will in principle be implemented by larger numbers of lower bit-width ALUs operating in parallel. This may simplify the handling of the carry and improve speed (certainly in ripple carry-based designs).

The CoPU 140 may also be implemented in hardware using analogue circuit components. The digital multiplexers of the CoPU 140 of FIG. 3 may be replaced by analogue multiplexers, i.e. the superposition module of the CoPU 140 may comprise an analogue multiplexer-demultiplexer pair configured to concatenate the two or more of the hypervectors. The ALU of FIG. 3 may be replaced by an analogue ALU (aALU), for example an aALU comprising the circuits shown in FIG. 4*a* (and optionally FIG. 4*b*) and implementing basic arithmetic operations as shown in FIG. 4*c*. The binding module of the CoPU 140 may thus comprise the core circuit shown in FIG. 4*a*

Figure 4A:
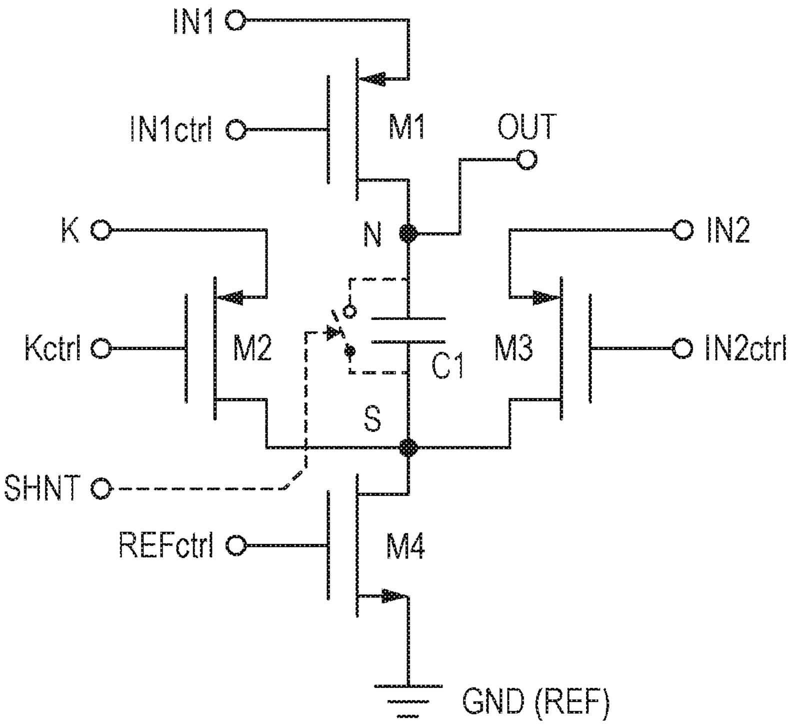

In order to perform add/sub operations on analogue voltages, the aALU may comprise the core circuit shown in FIG. 4*a*. The core circuit comprises or consists of a sampling capacitor C1 whose terminals are marked as 'North' (N) and 'South' (S) and at least 4 (optionally 5) switching elements, e.g. transistors that all act as switches. The transistor M2 of the core circuit shown in FIG. 4*a* may be optional, and be advantageously used for arithmetic over- and/or underflow operations. The North terminal is the output of the core circuit and is intended to connect to a small capacitive load. When M1 is ON, the input from operand A is passed to the N terminal (through port IN1). Similarly the switches connecting to the S terminal enforce a capacitor plate voltage of either K, REF (the reference voltage against which inputs are measured) or the voltage requested by operand B (through port IN2).

The analogue binding module may thus comprise a capacitor connected between a first node N and a second node S, an output node OUT connected to the first node N, a first input node IN1 connectable to the first node N by a first switching element M1, a second input node IN2 connectable to the second node S by a second switching element M3, and a ground node GND or reference node REF connectable to the second node S by a third switching element M4. Optionally, a third input node K may be connectable to the second node S via a fourth switching element M2. The analogue binding module may be for adding and/or subtracting analogue voltages, for example in the manner discussed below in relation to FIG. 4*c*.

Figure 4B:
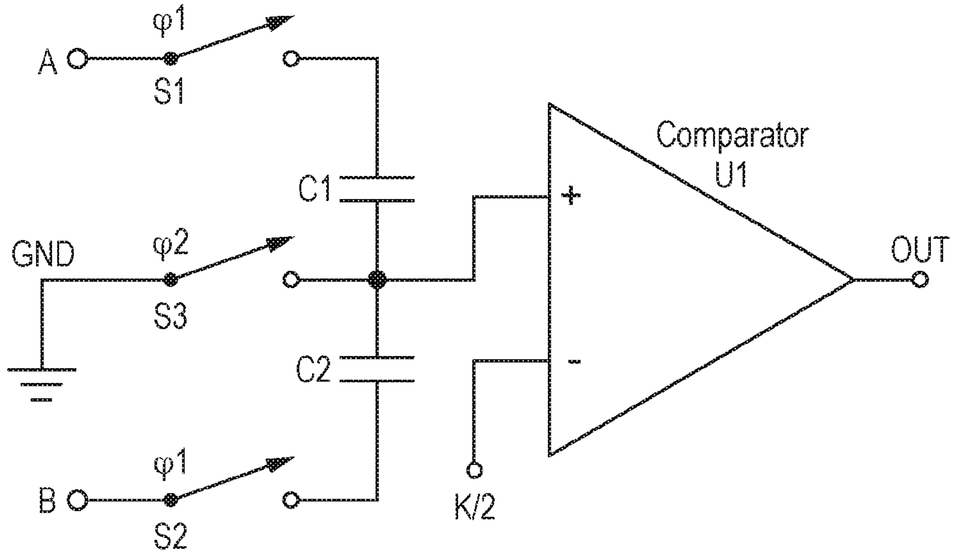
Figure 4C:
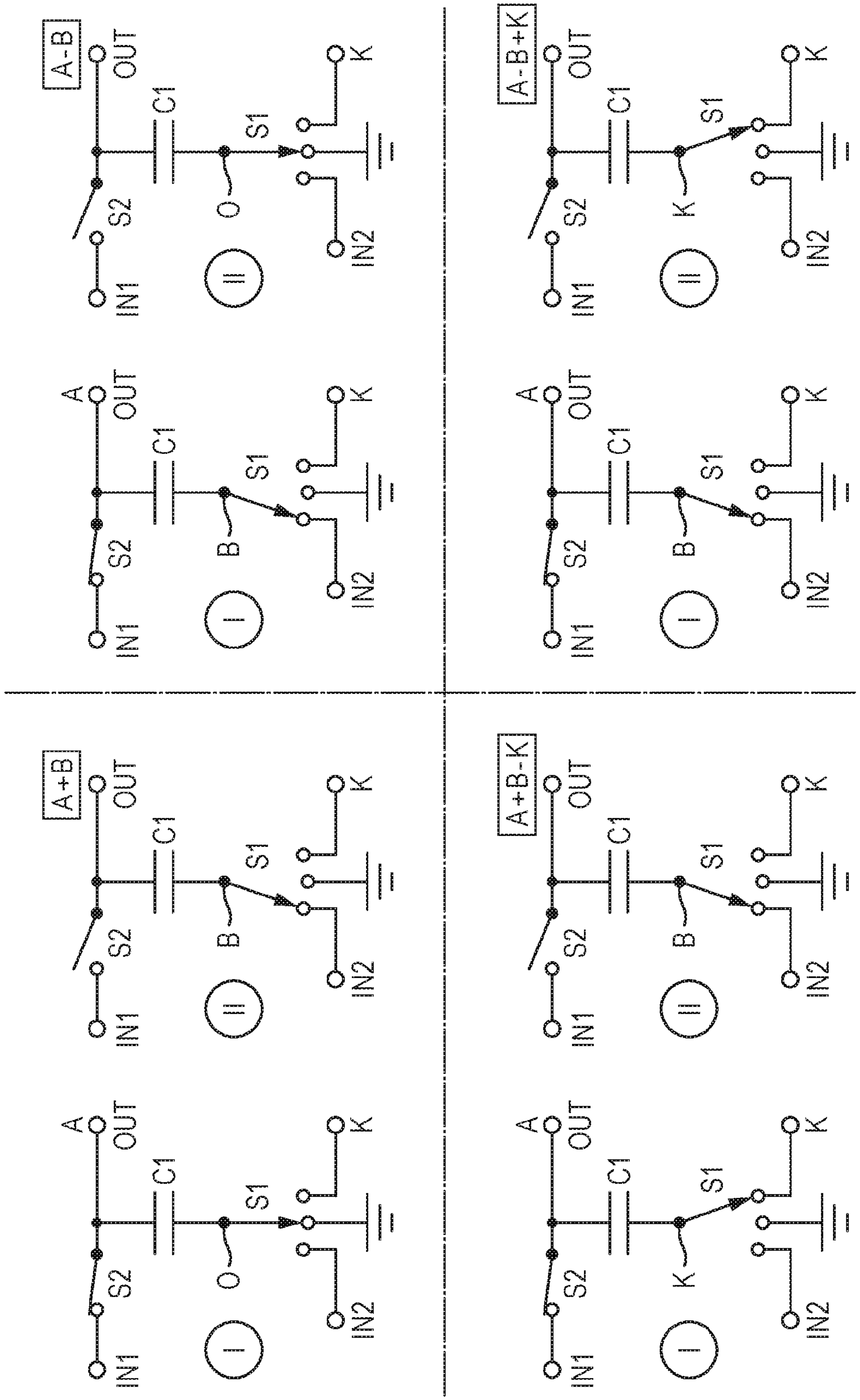

Optionally, the aALU may comprise auxiliary modules allowing the aALU to handle arithmetic over- and underflows. Such auxiliary modules include:

i) a capacitive divider feeding a comparator as shown in FIG. 4*b*. When the terminals of the divider are connected to inputs A and B, the middle of the capacitive divider captures the average input voltage, which is then compared against the voltage corresponding to the middle of the barrel $$\frac{K+REF}{2}\left(\frac{K}{2}\text{ if }REF=0\right).$$

Reset switch S3 zeroes all the voltages in preparation for the next set of inputs. The comparator itself may be a standard, low-power clocked comparator or a more recently proposed ultra-low power memristor-enhanced inverter, which can be tuned post-production to the correct threshold with potentially very fine accuracy. If the comparator determines that $$\frac{A+B}{2}>\frac{K}{2},$$

then an overflow ADD operation is required.

ii) A clocked comparator determining whether A<B. If true, then an underflow SUB is required for computing A−B.

iii) A small state machine orchestrating the execution of each operation (not shown).

The basic operations (ADD/SUB with and without over/underflow) are each carried out in two phases (I, II) as follows: For simple ADD: (I) operand A is passed to the N terminal whilst the S terminal is grounded to REF. Next, (II) both terminals are disconnected and S is connected to operand B (IN2). The output voltage vs REF is approximately A+B. For SUB, (I) N is connected to IN1 and S to IN2, thus enforcing a voltage difference of A−B across the plates of C1. Then, (II) both inputs are disconnected and S is connected to REF. The output voltage vs REF is now A−B. For ADDOVFL (add with overflow) (I) N is connected to IN1 and S to K, thus forcing the N capacitor plate to a voltage of A. Subsequently (II) both terminals are disconnected and S is linked to IN2. The voltage at S drops by K−B and therefore at the end of the operation the voltage at N becomes A+B−K. Finally, for SUBUFL (subtract with underflow) phase (I) is exactly the same as for SUB. In phase (II), however, S is connected to K instead of GND. Thus the final voltage at the output node is A−B+K. All these operations are summarised in FIG. 4*c*. Finally, in order to reset the system the capacitor's N and S terminals are shunted together through an nMOS device. This is controlled by input signal SHNT.

When over/underflow is to be disregarded, then the core circuit shown in FIG. 4*a* may be implemented without transistor M2 or the K and Kctrl nodes.

The CoPU 140 is thus not limited to being implemented using digital hardware as shown in FIG. 3, but may be implemented based on analogue hardware or based on other configurations.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. It is explicitly stated that all value ranges or indications of groups of entities disclose every possible intermediate value or intermediate entity for the purpose of original disclosure as well as for the purpose of restricting the claimed invention, in particular as limits of value ranges.

Figure 5A:
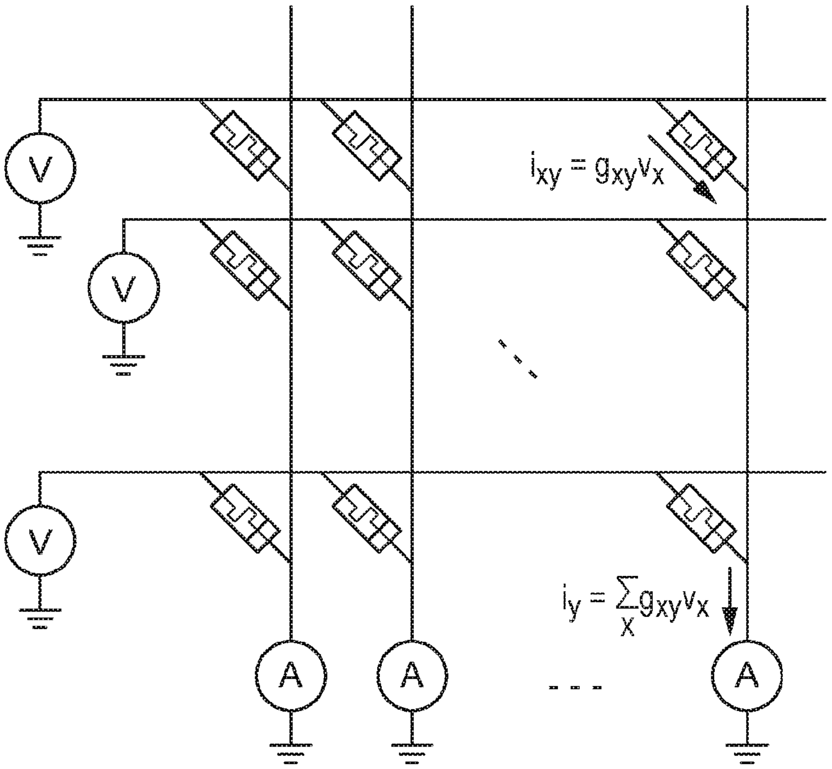

The aALU may be used for the purposes of performing the binding operation on analogue signals, or may be used for other purposes which may be unrelated to the method, CoPU and cognitive computing system described above. The technical context in which the aALU may be used, as well as further details of the aALU, will be described below with reference to FIGS. 4 and 5. In this regard:

FIG. 5*a* shows a typical example of analogue computation using memristive devices: Memristors use Ohm's law to carry out analogue multiplication, typically of a known input voltage $v_x$ with a conductance g, in order to yield a current $i_{xy}$, where x; y simple coordinate indices. A crossbar array naturally aggregates these products into sums of products, i.e. dot products $i_y$.

Figure 5B:
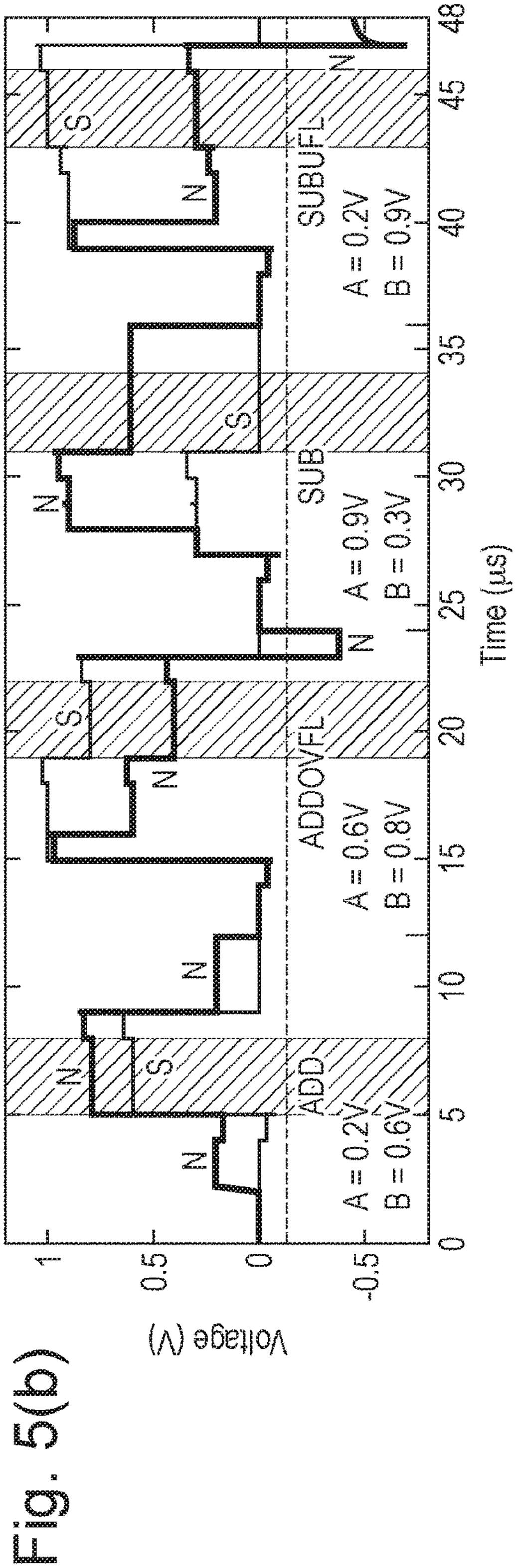

FIG. 5*b* shows aALU operation: The voltage at the output node or capacitive North terminal (marked "N") and capacitor South terminal (marked "S") are shown for each of the four basic operations. Darker shadings indicate the intervals of time when the answer to the arithmetic operation is available. For numerical values of answers, see the table below.

FIG. 5*b* shows energy dissipation of the ALU for each basic operation (disadvantageous rounding): The main dissipation components are clearly visible during each operation: i) Large jumps when the voltage across the plates of C1 is changed, ii) smaller jumps probably arising from toggling of control switches, iii) gentle slopes attributed to leakages. For each arithmetic operation the total energy expenditure and maximum voltage changes ΔVmax forced across the plates of C1 are also displayed. Inset: Energy (E) vs. ΔVmax and linear fit.

The continuous maturation of novel nanoelectronic devices exhibiting finely tuneable resistive switching is rekindling interest in analogue-domain computation. Regardless of domain, a useful computational module is the arithmetic-logic unit (ALU), which is capable of performing one or more fundamental mathematical operations (typical example: addition and subtraction). Disclosed is a design for an analogue ALU (aALU) capable of performing barrel addition and subtraction (i.e. ADD/SUB in modular arithmetic). The circuit only requires 5 minimum-size transistors and 1 capacitor. The aALU is in principle capable of handling 5 bits of information using a single input/output wire. Core power dissipation per operation is estimated to peak at ≈59 fJ (input operand-dependent) in TSMC's 65 nm technology.

The advent of memristive devices [1] has rekindled interest in analogue-domain computing. This is primarily evidenced by an ever increasing body of literature demonstrating how the tuneable resistive states (RS) of memristive devices may be exploited in order to carry out variable-constant multiplication operations using Ohm's law. When memristive devices are arranged in crossbar arrays [2], such multiplications can be naturally combined into dot product operations, as illustrated in FIG. 5*a*. Typical applications include memristive synapses, where the RS of the device plays the role of a synaptic weight [3], [4], Bayes rule implementations where an input distribution is multiplied by a conditional probability distribution encoded and stored in the memristive RS values [5] and similarly fuzzy logic implementations [6].

Once a memristive device or crossbar array has been used to perform a multiplication, the answer will presumably need to be utilised for further processing. The answer will often be in the form of an analogue current [7], [8], [9]. The further processing, on the other hand, will depend on the specific application, but a useful possibility would be some fundamental arithmetical operation, such as addition or multiplication. This motivates the study of possible aALU equivalents, (including the switched current version proposed in [10]), which can 'talk' to analogue memristor-based modules in their own signal domain. The operation(s) carried out by the aALU should ideally be specifically variable-variable, as opposed to variable-constant. The difference lies in the unequal treatment of the input operands: in a variable-constant system such as a memristive multiplication or dot product module one operand is inputted as an electrical signal and is therefore very fast, whilst the other operand needs to be programmed into the RS of the memristor. This may be substantially slower and more energetically taxing [11], even though in principle still possibly competitive [12], [13]. Any aALU will ideally be able to treat both operands at very similar speeds and energy budgets.

Disclosed is a switch-capacitor ('charge mode') concept circuit for performing analogue-domain barrel addition and subtraction. At its heart lies a simple 5T1C (5-transistor, 1-capacitor) module carrying out the actual arithmetic operations, with a few small helper modules helping handle over/underflows and overall program flow control. The circuit is simulated using the commercially available TSMC 65 nm technology and its functionality shown for each of the fundamental operations: add and subtract, with and without over/underflow. Power dissipation estimates are also provided for the core circuit in each case. It is envisaged that an aALU as proposed may be time-shared between a large number of signal sources within the context of a more general analogue-domain processor architecture.

In the following, the proposed circuit and its operation are described. The results of simulations including performance indicators are disclosed and finally the disclosure concludes with a general interest discussion.

A typical manner of operating memristive devices and/or crossbar arrays prescribes application of a known voltage across the terminals of the memristor and then measuring the output current $i_{out}$ given by $i_{out}=v_{in}\cdot g_{mem}$, where $v_{in}$ is the input voltage and $g_{mem}$ is the conductance of the memristor at $v_{in}$. This can then be converted to a voltage by use of a trans-impedance amplifier (TIA).

In order to perform barrel add/sub operations on such analogue voltages the core 5T1C circuit shown in FIG. 4*a* is used. It comprises or consists of a sampling capacitor C1 whose terminals are marked as 'North' (N) and 'South' (S) and 5 transistors that all act as switches. The North terminal is the output of the system and is intended to connect to a small capacitive load. When M1 is ON, the input from operand A is passed to the N terminal (through port IN1). Similarly, the switches connecting to the S terminal enforce a capacitor plate voltage of either K (the size of the barrel), REF (the reference voltage against which inputs are measured) or the voltage requested by operand B (through port IN2).

The auxiliary modules allowing the system to handle over- and underflows include: i) a capacitive divider feeding a comparator as shown in FIG. 4*b*. When the terminals of the divider are connected to inputs A and B the middle of the capacitive divider captures the average input voltage, which is then compared against the voltage corresponding to the middle of the barrel $$\frac{K+REF}{2}\left(\frac{K}{2} \text{ if } REF=0\right).$$

Reset switch S3 zeroes all the voltages in preparation for the next set of inputs. The comparator itself may be a standard, low-power clocked comparator or a more recently proposed ultra-low power memristor-enhanced inverter [14], which can be tuned post-production to the correct threshold with potentially very fine accuracy [15]. If the comparator determines that $$\frac{A+B}{2} > \frac{K}{2},$$

then an overflow ADD operation is required. ii) a clocked comparator determining whether A<B. If true, then an underflow SUB is required for computing A−B. iii) A small state machine orchestrating the execution of each operation (not included in this disclosure).

The basic operations (ADD/SUB with and without over/underflow) are each carried out in two phases (I, II) as follows: For simple ADD: (I) operand A is passed to the N terminal whilst the S terminal is grounded to REF. Next, (II) both terminals are disconnected and S is connected to operand B (IN2). The output voltage vs REF is approximately A+B. For SUB, (I) N is connected to IN1 and S to IN2, thus enforcing a voltage difference of A−B across the plates of C1. Then, (II) both inputs are disconnected and S is connected to REF. The output voltage vs REF is now A−B. For ADDOVFL (add with overflow) (I) N is connected to IN1 and S to K, thus forcing the N capacitor plate to a voltage of A. Subsequently (II) both terminals are disconnected and S is linked to IN2. The voltage at S drops by K−B and therefore at the end of the operation the voltage at N becomes A+B−K. Finally, for SUBUFL (subtract with underflow) phase (I) is exactly the same as for SUB. In phase (II), however, S is connected to K instead of GND. Thus the final voltage at the output node is A−B+K. All these operations are summarised in FIG. 4*c*.

Finally, in order to reset the system the capacitor's N and S terminals are shunted together through an nMOS device. This is controlled by input signal SHNT.

Simulation Mythology and Results

A. Set-Up

The proposed aALU was simulated in TSMC 65 nm technology. Since all MOSFETs involved were used as switches they were kept at minimum size. The central capacitor was implemented using a classical metal-insulator-metal (MIM) structure and at 4×4 $\mu m^2$ exhibited a capacitance of ≈35.1 fF. As a load, an nMOS transistor with W/L of 400/120 nm was used (minimum W/L: 200/60 nm), representing a total capacitive load of ≈500 fF. For reference minimum size pMOS and nMOS devices exhibit capacitances of ≈200 fF each. The power supply rails were set to VDD=+1.2V and Vss=−0.3 V in order to ensure input voltage swing down to 0.2 V (full swing [0.2, 1.2] V). In this work REF=GND. All control signal transitions were carried with a rise time of 1 ns and the input signals were set as per the table below.

| Time Step | 0 | 1 | 2 | 3 | 4 | 5 |
|---|---|---|---|---|---|---|
| ADD | SH↑ | SH↓ | IN1c↓ | IN1↑ | REFc↓ | IN2c↓ |
| ADDOVFL | SH↑ | SH↓ | REFc↓ | Kc↓ | IN1c↓ | IN1c↑ |
| SUB | SH↑ | SH↓ | REFc↓ | IN2c↓ | IN1c↓ | IN1c↑ |
| SUBUFL | SH↑ | SH↓ | REFc↓ | IN2c↓ | IN1c↓ | IN1c↑ |

| Time Step | 6 | 7 | 8 | 9 | 10 | 11 |
|---|---|---|---|---|---|---|
| ADD | — | — | In2c↑ | REFc↑ | — | — |
| ADDOVFL | Kc↑ | IN2c↓ | — | — | In2c↑ | REFc↑ |
| SUB | In2c↑ | REFc↑ | — | — | — | — |
| SUBUFL | In2c↑ | Kc↓ | — | — | Kc↑ | REFc↑ |

The simulations were ran based on a clock period of 1 μs to ensure solid convergence of the capacitor plate voltages, though results showed this can be substantially reduced. Simulations were set up to cycle the ALU through all four basic operations, checking for both functionality and power dissipation.

B. Functionality Testing

The stimulation protocols were deliberately designed so that at any given point in time only one of the five control inputs is allowed to change (recall the table above). Under this scheme and for display clarity each basic operation was allocated 12 clock cycles, which was conservative (ADD needs only 10 and SUB only 8). It is expected that in an optimised operation regime some of the control signal changes may be carried out simultaneously, thus saving (mainly leakage) power dissipation and operation time. Note: at the beginning of all operations all control switches in the system are disengaged except REFctrl, which holds node S to GND.

Results are summarised in the table below and the output of the system is shown in FIG. 5*b*.

| | ADD | ADDOVFL | SUB | SUBUFL |
|---|---|---|---|---|
| A | 0.2 | 0.6 | 0.9 | 0.2 |
| B | 0.6 | 0.8 | 0.3 | 0.9 |
| OUT | 0.788 | 0.407 | 0.610 | 0.301 |
| Ideal | 0.8 | 0.4 | 0.6 | 0.3 |

Under the assumption of accurate drivers at its inputs and good grounding the largest error for the example cases is approx. 12 mV. In a valid input range of 1 V this equates to 1.2% error and allows accurate representation of up to 83 possible outputs. This is equivalent to slightly more than 6 resolvable bits if the output is quantised. The main sources of accuracy degradation are expected to be: i) the presence of parasitic and load capacitances (basic capacitive divider theory) and ii) possible issues enforcing low operand input voltages (pMOS passes weak 0s).

C. Power Performance

Assessing power dissipation in the aALU needs a bespoke definition of the term. As the system does not have a power supply directly connected to it its power dissipation can be understood as the energy it forces its drivers to consume. This is split into two main categories: i) charging/discharging the central capacitor and ii) toggling the control switches. It is clear that the former will dominate dissipation due to the dominantly large capacitance of C1. We thus neglect the switch toggling energy consumption for this analysis.

We may now proceed with our definition of power dissipation. The logic is as follows: The aALU acts as an intermediary, shuttling current between one driver and another. For example in the case of ADD at t≈2 μs IN1 drives current into capacitor terminal N, whilst GND draws almost equally much out of terminal S. For the purposes of power dissipation we may thus consider the flow of this current/charge from VDD to VSS as dissipation directly attributable to the ALU. This is described as $P=i_{transit}*(VDD-VSS)$, where P is power dissipation and $i_{transit}$ the 'transit' current under consideration. From this example basis we may generalise to a full formula for power dissipation:

$$P = \frac{\sum |iport|}{2} \cdot (VDD - VSS),$$

where $i_{port}$ is the current flowing into each of the input ports of the system (IN1, IN2, K, GND) and it is easy to prove that by Kirchhoff's current law yields the total transit current.

Figure 5C:
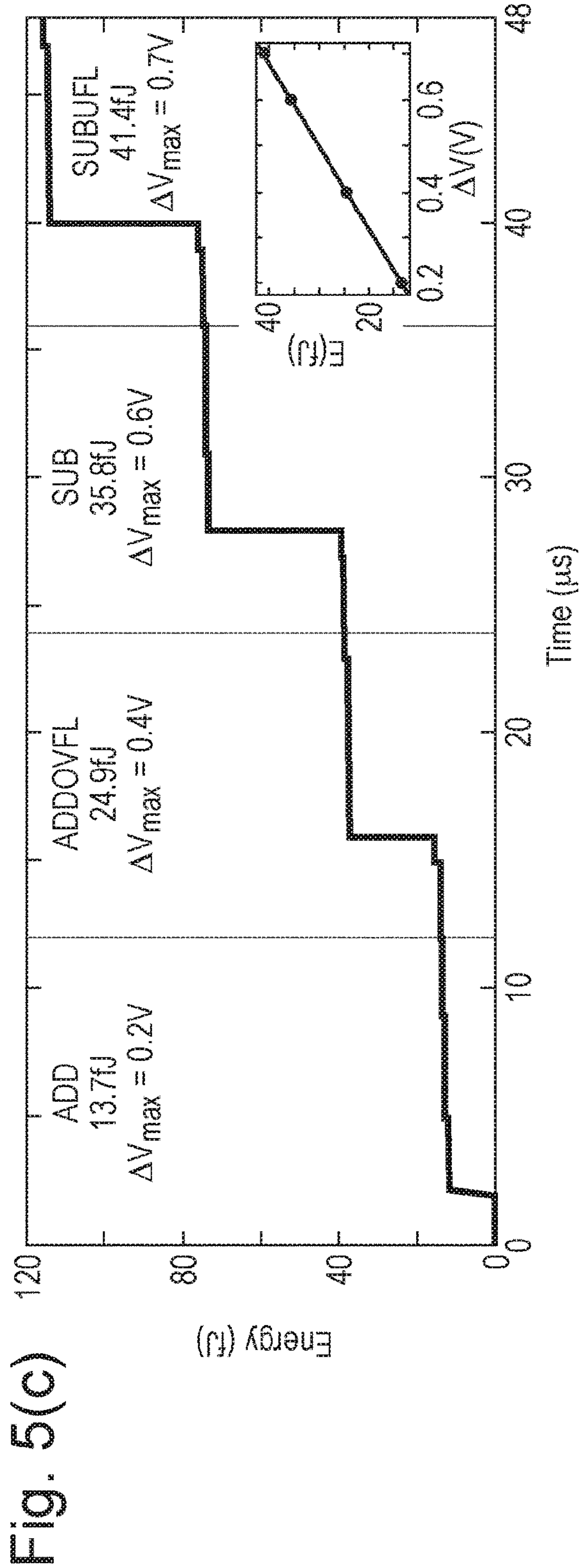

Given the equation above we may proceed to compute and plot the time integral of power dissipation (energy) during operation, shown in FIG. 5c. We note that during each operation energy dissipation occurs primarily during a single step when the voltage across the plates of the central capacitor is being changed. This occurs at t={2, 16, 28, 40} µs, when IN1ctrl goes low. Notably, when IN2 (B) is fed into the ALU, both C1 terminals experience similar changes in voltage. Thus, the effective capacitance that needs to be serviced does not include C1 itself; only the parasitics 'visible' from both plates of C1. The rest of the energy dissipation occurs through slow leakages (gentle upward slopes in FIG. 5c). The smaller jumps seen in FIG. 5c are currently attributed to charge injection/kickback while control transistors are switching and thus are likely to indirectly capture some of the energy required for operating the controls of the system.

The energy dissipation for performing different computations will depend strongly on the numbers being added, i.e. the maximum change in voltage forced across the plates C1. Performing a linear fit on Energy (E) vs. $\Delta V_{max}$ (inset FIG. 5c) we determine a power dissipation approximated well by: $E=(55.3\cdot\Delta V+2.7)$ fJ/op (approx. 55.3±1, 2.7±0.5). For $\Delta V=\Delta V_{max}=1$ V this yields total power dissipation of ≈60 fJ/op.

DISCUSSION AND CONCLUSIONS

Brief tests have concluded that a digital, 6-bit barrel ADD/SUB module in the same technology would spend a maximum of ≈35 fJ/operation. The question thus naturally arises: why use the proposed design? To this the answer is threefold: i) If the ALU is to be used in an analogue context (e.g. in an ANN using memristive crossbar arrays for analogue multiplication), then an important set of arithmetic operations becomes possible without the need to translate signals between domains. This is a big step towards possibly rendering fully analogue data processing systems viable. ii) The aALU in itself is extraordinarily small, at only five minimum-size transistors. Most of the area consumed is the capacitor in the back-end-of-line. This may allow tighter squeezing of other circuits around it, or successful, large-scale arraying of the design. iii) Carrying out arithmetic in e.g. 32-level analogue means that each individual signal line carries 6 bits of information, impacting wiring complexity and overall parasitic capacitance/bit of information transmitted. The precise advantage vs a conventional ALU still needs to be determined. As a result the case will probably be ultimately resolved at the system level, e.g. in whether analogue artificial neurons and synapses mange to outperform corresponding, full-digital implementations.

Another interesting point concerns the interplay between ALU accuracy, noise performance and C1 capacitance. We observe that: i) Large capacitances will dominate over parasitics more easily, providing smaller deviations between ideal and actual results (capacitance-accuracy trade-off). Thus the desired accuracy level will dictate the value of C1. ii) Any noise or uncertainty in the input values will directly affect how meaningful the answers of the aALU are. This sets a limit on the maximum useful value of C1. Finally, each extra bit of accuracy requested translates into an exponentially increasing demand on the capacitance value of C1 (proportional representation of data). This highlights a key difference between analogue and digital representation systems, namely that in digital, numbers (quantities) are represented using a positional, logarithmic system, whilst in analogue the representation is absolute/proportional. As a result, for each additional bit accuracy requested, the capacitances that need to be charged/discharged in order to perform a computation will scale linearly for digital and exponentially for analogue (as will power). Of course, nothing prevents analogue systems from being 'chained' in order to form a positional representation system; i.e. a numbering system with radix N instead of 2. This naturally gives rise to a question: given the cost of parasitics and multiple signal lines at low values of N and the cost of resolving between ever smaller differences in voltage between signal levels at high values of N, what is the optimal value of N? Thus far the answer has been: 2. Yet perhaps the advent of memristive devices or other nanoscale tuneable electronic components that can be freely intermingled with CMOS may change that.

REFERENCES

[1] R. Waser and M. Aono, "Nanoionics-based resistive switching memories," Nature materials, vol. 6, no. 11, p. 833, 2007.

[2] X. Ma, D. B. Strukov, J. H. Lee, and K. K. Likharev, "Afterlife for silicon: Cmol circuit architectures," in Nanotechnology, 2005. 5th IEEE Conference on. IEEE, 2005, pp. 175-178.

[3] M. Prezioso, F. Merrikh-Bayat, B. Hoskins, G. Adam, K. K. Likharev, and D. B. Strukov, "Training and operation of an integrated neuromorphic network based on metal-oxide memristors," Nature, vol. 521, no. 7550, p. 61, 2015.

[4] A. Serb, J. Bill, A. Khiat, R. Berdan, R. Legenstein, and T. Prodromakis, "Unsupervised learning in probabilistic neural networks with multi-state metal-oxide memristive synapses," Nature communications, vol. 7, p. 12611, 2016.

[5] A. Serb, E. Manino, I. Messaris, L. Tran-Thanh, and T. Prodromakis, "Hardware-level bayesian inference," in 31st Conference on Neural Information Processing Systems (NIPS). NIPS, 2018.

[6] F. Merrikh-Bayat and S. B. Shouraki, "Memristive neuro-fuzzy system." IEEE Trans. Cybernetics, vol. 43, no. 1, pp. 269-285, 2013.

[7] R. Berdan, A. Serb, A. Khiat, A. Regoutz, C. Papavassiliou, and T. Prodromakis, "A u-controller-based system for interfacing selectorless rram crossbar arrays," IEEE Transactions on Electron Devices, vol. 62, no. 7, pp. 2190-2196, 2015.

[8] M. A. Zidan, H. Omran, A. Sultan, H. A. Fahmy, and K. N. Salama, "Compensated readout for high-density mos-gated memristor crossbar array," IEEE Transactions on Nanotechnology, vol. 14, no. 1, pp. 3-6, 2015.

[9] A. Serb, W. Redman-White, C. Papavassiliou, and T. Prodromakis, "Practical determination of individual element resistive states in selectorless rram arrays," IEEE Transactions on Circuits and Systems I: Regular Papers, vol. 63, no. 6, pp. 827-835, 2016.

[10] P. Dudek and P. J. Hicks, "A cmos general-purpose sampled-data analogue microprocessor," in Circuits and Systems, 2000. Proceedings. ISCAS 2000 Geneva. The 2000 IEEE International Symposium on, vol. 2. IEEE, 2000, pp. 417-420.

[11] H. Schroeder, V. V. Zhirnov, R. K. Cavin, and R. Waser, "Voltage-time dilemma of pure electronic mechanisms in resistive switching memory cells," Journal of applied physics, vol. 107, no. 5, p. 054517, 2010.

[12] A. C. Torrezan, J. P. Strachan, G. Medeiros-Ribeiro, and R. S. Williams, "Sub-nanosecond switching of a tantalum oxide memristor," Nanotechnology, vol. 22, no. 48, p. 485203, 2011.

[13] F. Alibart, L. Gao, B. D. Hoskins, and D. B. Strukov, "High precision tuning of state for memristive devices by adaptable variation-tolerant algorithm," Nanotechnology, vol. 23, no. 7, p. 075201, 2012.

[14] A. Serb, A. Khiat, and T. Prodromakis, "Seamlessly fused digital-analogue reconfigurable computing using memristors," Nature communications, vol. 9, no. 1, p. 2170, 2018.

[15] S. Stathopoulos, A. Khiat, M. Trapatseli, S. Cortese, A. Serb, I. Valov, and T. Prodromakis, "Multibit memory operation of metal-oxide bi-layer memristors," Scientific reports, vol. 7, no. 1, p. 17532, 2017.

The invention claimed is:

1. A computer-implemented method for creating encoded data for use in a cognitive computing system, the method comprising:

receiving a plurality of hypervectors in a binary format, each representing a respective semantic object, wherein each of the plurality of hypervectors in the binary format comprises a plurality of elements each being an integer element and each integer element being represented as a binary number using a fixed number of bits greater than 1;

performing element-wise modular addition of two or more of the plurality of hypervectors in the binary format, thereby binding the corresponding semantic objects; and performing vector concatenation of two or more of the plurality of hypervectors in the binary format, thereby superposing the corresponding semantic objects.

2. The method of claim 1, wherein the plurality of hypervectors in the binary format are generated by an artificial neural network.

3. The method of claim 1, further comprising:

storing each of the plurality of hypervectors in the binary format created by at least one of: the element-wise modular addition or the vector concatenation.

4. The method of claim 1, wherein the method is for creating encoded data for use by an artificial neural network for the purpose of input data classification, and wherein the method further comprises:

using, by the artificial neural network, a hypervector created by the element-wise modular addition and/or the vector concatenation, for encoding input data received by the artificial neural network.

5. The method of claim 1, further comprising:

decoding, by an artificial neural network, a hypervector created by the element-wise modular addition and/or the vector concatenation, to generate output data for use by an output device.

6. The method of claim 1, wherein the plurality of hypervectors in the binary format comprises one or more invertible hypervectors, each representing a respective pointer semantic object, and one or more invertible or non-invertible hypervectors, each representing a respective filler semantic object.

7. The method of claim 6, wherein the method is for extracting information from a cognitive computing system, wherein performing element-wise modular addition comprises:

binding a filler semantic object to a pointer base item, thereby creating a first hypervector, and extracting the hypervector representing the filler semantic object from the first hypervector by binding the first hypervector with the inverse of the hypervector representing the pointer base item.

8. The method of claim 1, wherein each of the plurality of hypervectors in the binary format has a maximum allowable length n, and wherein the performing vector concatenation comprises raising an exception or a flag if the length of the hypervector created by the performing vector concatenation exceeds n.

9. The method of claim 8, wherein n is a power of 2.

10. The method of claim 1, wherein each of the plurality of hypervectors in the binary format consists of one or more subvectors, wherein each subvector has a fixed length y.

11. The method of claim 10, wherein:

the plurality of hypervectors in the binary format comprises one or more invertible hypervectors, each representing a respective pointer semantic object, and one or more invertible or non-invertible hypervectors, each representing a respective filler semantic object; and each hypervector representing a pointer semantic object or a filler semantic object consists of one subvector.

12. The method of claim 1, wherein each element of each of the plurality of hypervectors in the binary format is an integer in the range from 0 to p-1.

13. The method of claim 12, wherein p is a prime number.

14. The method of claim 12, wherein:

each of the plurality of hypervectors in the binary format consists of one or more subvectors, wherein each subvector has a fixed length y; and one or both of y and p are powers of 2.

15. A cognitive processing unit for use in a cognitive computing system, the cognitive processing unit comprising:

an input configured to receive a plurality of hypervectors in a binary format, each representing a respective semantic object, wherein each of the plurality of hypervectors in the binary format comprises a plurality of elements each being an integer element and each integer element being represented as a binary number using a fixed number of bits greater than 1;

a superposition module configured to concatenate two or more of the plurality of hypervectors in the binary format; and a binding module configured to perform element-wise modular addition of two or more of the plurality of hypervectors in the binary format.

16. The cognitive processing unit of claim 15, further comprising:

one or more buffer arrays configured to temporarily hold at least one of: the received plurality of hypervectors in the binary format, the two or more of the plurality of hypervectors in the binary format created by the superposition module, or the binding module.

17. The cognitive processing unit of claim 15, wherein the superposition module comprises a multiplexer-demultiplexer pair configured to concatenate the two or more of the plurality of hypervectors in the binary format.

18. The cognitive processing unit of claim 15, wherein the binding module comprises an add/subtract circuit configured to perform element-wise modular addition or subtraction of the two or more of the plurality of hypervectors in the binary format.

19. A cognitive computing system comprising the cognitive processing unit of claim 15.

20. The cognitive computing system of claim 19, further comprising:

an artificial neural network configured to generate the plurality of hypervectors in the binary format received by the cognitive processing unit.

21. The cognitive computing system of claim 20, wherein the artificial neural network is further configured to:

encode input data generated by a sensor using a hypervector created by the cognitive processing unit.

22. The cognitive computing system of claim 20, wherein the artificial neural network is further configured to:

generate an output signal for use by an output device by decoding a hypervector created by the cognitive processing unit.

23. The cognitive computing system of claim 19, further comprising:

a memory configured to store the hypervector created by the cognitive processing unit.

24. A non-transitory computer-readable medium storing a set of instructions that, when executed by a processor, cause the processor to:

receive a plurality of hypervectors in a binary format, each representing a respective semantic object, wherein each of the plurality of hypervectors in the binary format comprises a plurality of elements each being an integer element and each integer element being represented as a binary number using a fixed number of bits greater than 1;

perform element-wise modular addition of two or more of the plurality of hypervectors in the binary format, thereby binding the corresponding semantic objects; and perform vector concatenation of two or more of the plurality of hypervectors in the binary format, thereby superposing the corresponding semantic objects.

* * * * *